US012405244B2

(12) United States Patent
Fujioka et al.

(10) Patent No.: US 12,405,244 B2
(45) Date of Patent: Sep. 2, 2025

(54) ELECTROPHORESIS SYSTEM

(71) Applicant: HITACHI HIGH-TECH CORPORATION, Tokyo (JP)

(72) Inventors: Michiru Fujioka, Tokyo (JP); Takashi Anazawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 432 days.

(21) Appl. No.: 17/915,516

(22) PCT Filed: Apr. 16, 2020

(86) PCT No.: PCT/JP2020/016781
§ 371 (c)(1),
(2) Date: Sep. 29, 2022

(87) PCT Pub. No.: WO2021/210144
PCT Pub. Date: Oct. 21, 2021

(65) Prior Publication Data
US 2023/0124845 A1    Apr. 20, 2023

(51) Int. Cl.
*G01N 27/447* (2006.01)
(52) U.S. Cl.
CPC . *G01N 27/44721* (2013.01); *G01N 27/44791* (2013.01)
(58) Field of Classification Search
None
See application file for complete search history.

(56) References Cited

U.S. PATENT DOCUMENTS 6,787,017 B1    9/2004 Hirabayashi et al.
7,118,659 B2    10/2006 Kurt et al.
(Continued)

FOREIGN PATENT DOCUMENTS

JP    2005062115 A    3/2005
JP    2006515428 A    5/2006
(Continued)

OTHER PUBLICATIONS

International Search Report of PCT/JP2020/016781 dated Jul. 14, 2020.
(Continued)

*Primary Examiner* — J. Christopher Ball
(74) *Attorney, Agent, or Firm* — Mattingly & Malur, PC

(57) ABSTRACT

An electrophoresis system includes a plurality of capillaries in which electrophoresis of a sample is performed, a light source that irradiates detection positions of the capillaries with light, a light detector that detects light generated by the irradiation with the light by the light source that depends on components contained in the sample, and a buffer storage unit into which one end of the plurality of capillaries are inserted at a time of the electrophoresis of the sample and in which a buffer is stored. A computer controls an electrophoresis condition of each of the plurality of capillaries such that arrival times for the components that move in the plurality of capillaries to reach the detection positions are shifted from each other. As a result, it is possible to detect fluorescence signals at different timings in each of the plurality of capillaries.

16 Claims, 15 Drawing Sheets

(56) References Cited

U.S. PATENT DOCUMENTS

| | | | |
|---|---|---|---|
| 2002/0113213 A1* | 8/2002 | Amirkhanian | G01N 27/44782 250/458.1 |
| 2002/0140934 A1 | 10/2002 | Inaba et al. | |
| 2004/0168919 A1 | 9/2004 | Kurt et al. | |
| 2018/0024061 A1 | 1/2018 | Anazawa et al. | |

FOREIGN PATENT DOCUMENTS

| | | |
|---|---|---|
| JP | 3897277 B2 | 3/2007 |
| JP | 2011122963 A | 6/2011 |
| JP | 6456983 B2 | 1/2019 |
| WO | 2000/22426 A1 | 4/2000 |

OTHER PUBLICATIONS

Chinese Office Action received in corresponding Chinese Application No. 202080099281.4 dated Dec. 28, 2024.

* cited by examiner

FIG. 12

| | SAMPLE INJECTION TIME (MINUTES) | PEAK MEASUREMENT TIME (MINUTES) |
|---|---|---|
| CAPILLARY-1 | 0 | 12 TO 15 |
| CAPILLARY-2 | 3 | 15 TO 18 |
| CAPILLARY-3 | 6 | 18 TO 21 |
| CAPILLARY-4 | 9 | 21 TO 24 |
| CAPILLARY-5 | 12 | 24 TO 27 |
| CAPILLARY-6 | 15 | 27 TO 30 |
| CAPILLARY-7 | 18 | 30 TO 33 |
| CAPILLARY-8 | 21 | 33 TO 36 |
| CAPILLARY-9 | 24 | 36 TO 39 |
| CAPILLARY-10 | 27 | 39 TO 42 |
| CAPILLARY-11 | 30 | 42 TO 45 |
| CAPILLARY-12 | 33 | 45 TO 48 |
| ⋮ | ⋮ | ⋮ |

ELECTROPHORESIS SYSTEM

TECHNICAL FIELD

The present disclosure relates to an electrophoresis system.

BACKGROUND ART

A multi-capillary electrophoresis apparatus is widely used, which fills a plurality of capillaries with an electrolyte solution or an electrophoretic separation medium such as an electrolyte solution containing a polymer gel or a polymer, and performs electrophoresis analysis in parallel. There is a wide range of subjects to be analyzed for electrophoresis, from low molecular substances to high molecular substances such as proteins and nucleic acids. In addition, there are many measurement modes, such as a mode in which a light absorption point of each capillary is irradiated with lamp light and the absorption of the lamp light that occurs when a subject to be analyzed passes through the light absorption point is detected, or a mode in which a light emitting point of each capillary is irradiated with laser light and fluorescence or scattered light that occurs when a subject to be analyzed passes through the light emitting point is detected. Therefore, in recent years, in particular, there is a need for an electrophoresis method that achieves a high dynamic range and a high density.

For example, in Patent Literature 1, all capillaries present around a number A (A is an integer of 2 or greater) of light emitting points on a number A of capillaries are arrayed on the same plane, a laser beam is introduced from the side of the array plane to irradiate the light emitting points of all the capillaries at once, and fluorescence light emitted from each emission point in a direction perpendicular to the array plane is dispersed in wavelength and collectively detected at once. In a detection apparatus, fluorescence light emitted from the number A of light emitting points is collectively collected and collimated by one condensing lens, and is transmitted through one transmissive diffraction grating, and 1st order diffracted light of each fluorescence light is imaged collectively on one two-dimensional sensor by one imaging lens. Since the direction in which the number A of light emitting points are arrayed is perpendicular to the wavelength dispersion direction of the diffraction grating, wavelength dispersion images of the fluorescence light emitted from each capillary do not overlap each other on the two-dimensional sensor. By setting a number B (B is an integer of 1 or greater) of detection regions of an arbitrary wavelength band for the wavelength dispersion image of each capillary, a number B of colors can be detected. The color detection when B=1 is referred to as single-color detection. The color detection when B≥2 is referred to as multicolor detection. In the multi-capillary electrophoresis apparatus described in Patent Literature 1, for example, DNA sequencing by the Sanger method can be performed on different DNA samples in each capillary. In the Sanger method, DNA fragments included in a DNA sample are labelled with four types of phosphors based on terminal base types A, C, G, and T, and each emitted fluorescence light is identified by the multicolor detection.

In Patent Literature 2, all capillaries around a number A (A is an integer of 2 or greater) of light emitting points on a number A of capillaries are arrayed on the same plane, a laser beam is introduced from the side of the array plane to collectively irradiate light emitting points of all capillaries with the laser beam, and fluorescence light generated at each light emitting point in a direction perpendicular to the array plane is divided according to a wavelength component and collectively detected. In a detection apparatus, fluorescence light emitted from a number A of light emitting points is individually collimated by a number A of condensing lenses to form a number A of light fluxes, each of the light fluxes is incident in parallel on a single pair of dichroic mirror arrays with a number B (B is an integer of 1 or greater) of dichroic mirrors arrayed and is divided into a number B of light fluxes of different wavelength bands, the number A×B of generated light fluxes are incident in parallel on a single two-dimensional sensor, and a number A×B of divided images are generated on an image. In this case, since a direction in which the number A of light emitting points are arrayed is perpendicular to a direction in which the number B of light fluxes are divided by the dichroic mirror array, the number A×B of divided images do not overlap each other on the image and thus it is possible to set a number A×B of detection regions. As a result, B-color detection of each capillary can be performed. Therefore, in a multi-capillary electrophoresis system described in Patent Literature 2, for example, similarly to the case described in Patent Literature 1, DNA sequencing by the Sanger method can be performed on different DNA samples different in each capillary.

CITATION LIST

Patent Literature

Patent Literature 1: Japanese Patent No. 3897277
Patent Literature 2: Japanese Patent No. 6456983

SUMMARY OF INVENTION

Technical Problems

However, only by performing multicolor detection, it is not possible to identify fluorescence light emitted from a plurality of types of phosphors. This is due to the fact that, since fluorescence spectrums of each phosphor overlap each other, wavelengths of fluorescence light of a plurality of types of phosphors are in an arbitrary single wavelength band (spectrum crosstalk). In conventional methods, spectrum crosstalk is canceled by performing electrophoresis analysis on a matrix standard sample. Such a sample contains a plurality of components, and the components are labeled with different types of phosphors. When electrophoresis analysis is performed on the sample injected in each capillary, the plurality of components are separated and fluorescence signals of the phosphors with which the components are labeled are measured as peaks at different points of time. By performing this, a multicolor detection ratio of the fluorescence signal of each phosphor is calculated and the spectrum crosstalk is canceled by subtracting a contribution of the spectrum crosstalk based on this ratio.

On the other hand, in addition to the spectrum crosstalk, there is spatial crosstalk where fluorescence signals are mixed between multiple capillaries. The spatial crosstalk reduces sensitivity in electrophoresis analysis and performance in a high dynamic range. Therefore, although it is required to cancel the spatial crosstalk, a method therefor did not exist. Similarly to the cancelation of the spectrum crosstalk, a method of calculating a ratio of spatial crosstalk between different capillaries in advance and canceling spatial crosstalk by subtracting a contribution of the spatial crosstalk based on the ratio is proposed. In this case, when an existing matrix standard sample reagent is used to calculate the ratio of the spatial crosstalk, it is necessary to detect fluorescence signals at different timings for each capillary. However, in the conventional electrophoresis methods disclosed in the above-described Patent Literatures 1 and 2, fluorescence signals are detected at the same timing for each capillary and thus it is not possible to calculate the ratio of the spatial crosstalk.

The present disclosure has been made in view of the above-described circumstances and provides a technique capable of detecting fluorescence signals of a plurality of capillaries in an electrophoresis apparatus at different timings.

Solution to Problems

To solve the above-described problems, the present disclosure proposes an electrophoresis system that includes: an electrophoresis apparatus including a plurality of capillaries in which electrophoresis of a sample is performed, a light source that irradiates detection positions of the capillaries with light, a detector that detects light generated by the irradiation with the light by the light source and depending on components contained in the sample, a buffer storage unit (vessel) into which one ends of the plurality of capillaries are inserted at the time of the electrophoresis of the sample and in which a buffer is stored; and a computer that controls the electrophoresis apparatus. The computer controls or changes electrophoresis conditions of the plurality of capillaries in the electrophoresis apparatus such that arrival times for the components that are contained in the sample and move in the plurality of capillaries to reach the detection positions are shifted from each other. In the present disclosure, the plurality of types of electrophoresis conditions are presented and each of the electrophoresis conditions is referred to as a (operation) mode. In addition, it is assumed that not only the buffer but also the sample can be stored in the buffer storage unit (vessel).

Further features related to the present disclosure will be clarified from the description of the present specification and the accompanying drawings. In addition, aspects of the present disclosure are practiced and implemented by means of elements and combinations of various elements, aspects of the following detailed description, and the appended claims.

It should be understood that the description herein is merely exemplary and is not intended to limit the scope or the application of the claims in any way.

Advantageous Effects of Invention

According to the techniques described in the present disclosure, it is possible to detect fluorescence signals in each of a plurality of capillaries in an electrophoresis apparatus at different timings.

BRIEF DESCRIPTION OF DRAWINGS

FIG. 12 is a diagram illustrating a relationship between sample injection time points (sample injection timings) in a sample introduction timing shift mode (mode 4) and peak measurement time points (peak measurement timings) (1).

DESCRIPTION OF EMBODIMENTS

Example of Configuration of Electrophoresis System

Figure 1:
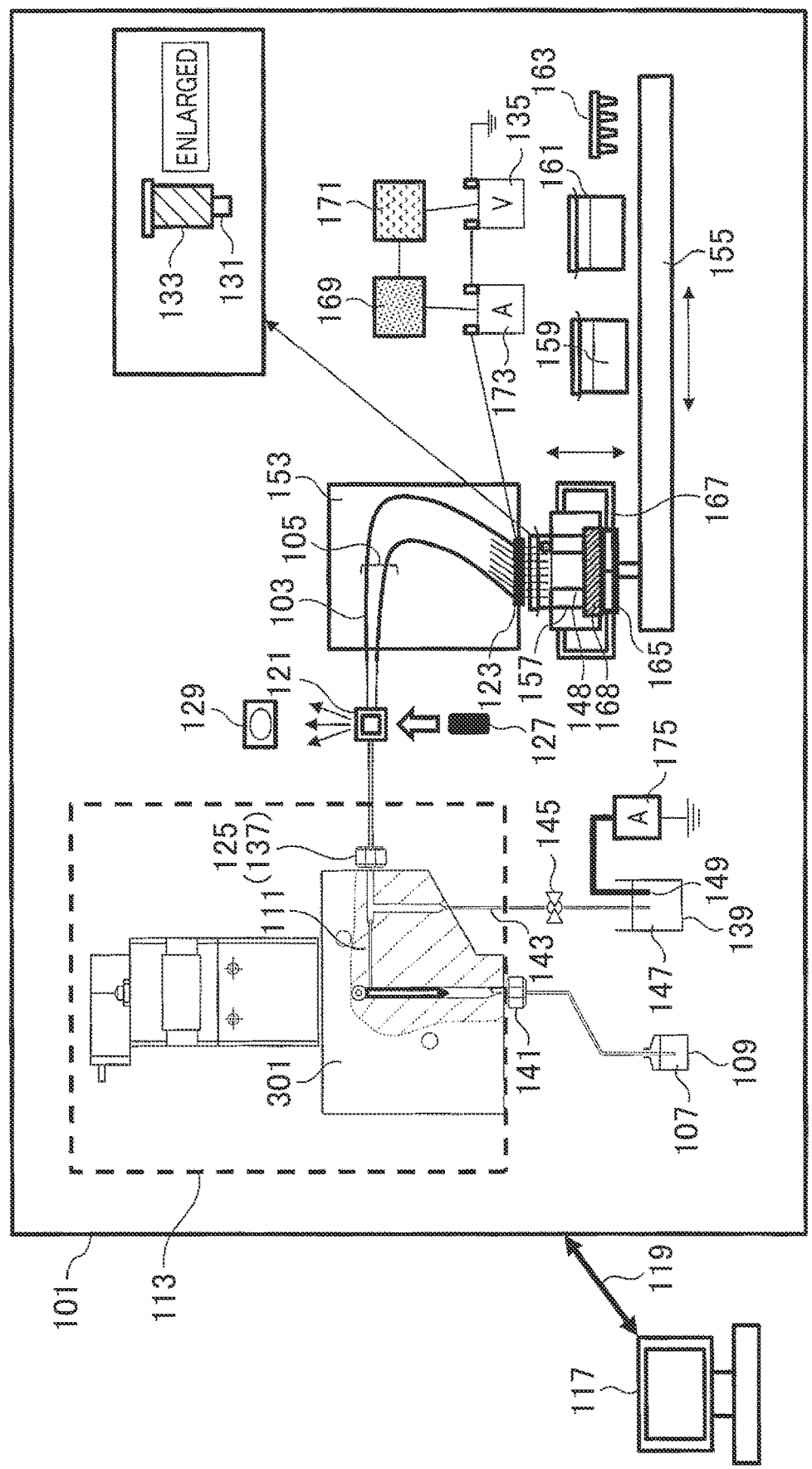
FIG. 1 is a diagram illustrating an example of a schematic configuration of an electrophoresis system 10 according to the present embodiment.

FIG. 1 is a diagram illustrating an example of a schematic configuration of an electrophoresis system 10 according to the present embodiment. As illustrated in FIG. 1, the electrophoresis system 10 includes an electrophoresis system 101 and a computer 117.

The electrophoresis apparatus 101 includes a capillary array 105 including a plurality of capillaries 103, a polymer vessel 109 for storing a polymer 107, and a pump mechanism 113 that has, formed therein, a pump flow path 111 connecting the capillaries 103 to the polymer vessel 109 and supplies the polymer 107 within the polymer vessel 109 to the capillaries 103. The electrophoresis apparatus 101 is connected to the computer 117. The computer 117 calculates a timing (injection timing) at which a sample and a buffer (buffer) are injected in each capillary, calculates a temperature gradient value of a temperature adjustment block 168, and outputs an electrophoresis analysis result.

In the electrophoresis apparatus 101, the capillary array 105 is a replacement member including the plurality of capillaries 103. When a measurement method is changed, the capillary array 105 is replaced and lengths of capillaries 103 are adjusted. In addition, when a capillary 103 is damaged or degraded in quality, the capillary array 105 is replaced with a new capillary array 105. The capillary array 105 includes not only the capillaries 103 but also a load header 123 and capillary head 125. Each of the capillaries 103 is constituted by a glass tube having an inner diameter of several tens to several hundreds of microns and an outer diameter of several hundreds of microns, and a surface of the glass tube is coated with polyimide to improve the strength. However, in a detection unit 121, polyimide coatings are removed from portions of the capillaries 103 located near light irradiation positions where the capillaries 103 are irradiated with excitation light. The insides of the capillaries 103 are filled with a separation medium for electrophoretic separation. A fluid separation medium and an illiquid separation medium are present. In the present embodiment, the fluid polymer 107 is used.

The detection unit 121 is arrayed and fixed to the portions of the capillaries 103 in the vicinity of the light irradiation positions with accuracy of several microns in height from an optical flat plane. At the time of electrophoresis, excitation light is emitted by a light source 127 and continuously transmitted through the light irradiation positions of all the capillaries 103. Due to the excitation light, information light (fluorescence light having a wavelength depending on a sample) is generated from the sample and emitted from the light irradiation positions to the outside of the capillaries 103. The information light is detected by an optical detector 129 and the sample is analyzed.

The load header 123 is provided at a capillary cathode terminal 131. The capillary cathode terminal 131 is fixed via hollow electrodes 133 made of metal. Ends of the capillaries 103 protrude from the hollow electrodes 133 by approximately 0.5 mm. In addition, the hollow electrodes 133 fixed to each capillary 103 are attached to the load header 123. The hollow electrodes 133 and the load header 123 are integrated. The hollow electrodes 133 are conductive with a high-voltage power supply 135. Therefore, when it is necessary to apply a voltage for electrophoresis or sample introduction, the hollow electrodes 133 function as cathode electrodes. In addition, in the electrode apparatus 101, a first ammeter 173 and a second ammeter 175 that detect a current are provided.

The capillary head 125 is a member that can be detached from the pump mechanism 113 in a pressure-tight manner. When a plurality of capillaries 103 are present, the capillary head 125 bundles capillary anode ends 137 together.

A check valve 141 is provided between the polymer vessel 109 and a block 301 in which the pump flow path 111 is formed. The check valve 141 has a function of allowing the polymer 107 to flow from the polymer vessel 109 into the block 301 and blocking the outflow of the polymer 107 from the block 301 to the polymer vessel 109. Therefore, when the polymer 107 is injected into the capillaries 103, the polymer 107 is prevented from flowing back into the polymer vessel 109. In addition, a connecting tube 143 that connects an anode-side buffer vessel 139 and the block 301 is connected to the block 301. The connecting tube 143 has an electric valve 145. The electric valve 145 opens and closes a flow path between the block 301 and the anode-side buffer vessel 139. The electric valve 145 at least closes the flow path between the block 301 and the anode-side buffer vessel 139 when the polymer 107 is to be injected into the capillaries 103, and prevents the outflow of the polymer 107 into the anode-side buffer vessel 139. In addition, when a current flows in electrophoresis or the like, the electric valve 145 opens the flow path to connect the block 301 to the anode-side buffer vessel 139. In addition, an electrode (GND) 149 is inserted in the anode-side buffer vessel 139 such that the electrode (GND) 149 is immersed in a buffer 147 within the anode-side buffer vessel 139.

The computer 117 is used in a state in which the computer 117 is connected via a communication cable 119. For example, similarly to a normal computer, the computer 117 includes a CPU (Central Processing Unit: processor), a storage device, a RAM, a ROM, input devices such as a keyboard and a mouse, output devices such as a speaker and a display device, a communication device, and the like and can control a function included in the electrophoresis apparatus 101 and transmit and receive data detected by the electrophoresis apparatus 101.

Furthermore, the electrophoresis apparatus 101 includes a constant temperature tank 153 for maintaining the capillaries 103 at a constant temperature, and a transport device 155 for transporting various vessels to the capillary cathode terminal 131. The capillaries 103 are set in the constant temperature tank 153 and heated to a predetermined temperature by the constant temperature tank 153. When a constant temperature tank temperature change mode to be described later is selected to change a sample movement speed in each capillary, the capillaries are heated to different temperatures.

The transport device 155 transports, to the capillary cathode terminal 131, a cathode-side buffer vessel 157, a cleaning vessel 159, a waste liquid vessel 161, a sample vessel 163, and a temperature adjustment block 168 for adjusting the temperature of the cathode-side buffer vessel 157 (the block 168 may perform the temperature adjustment with a temperature gradient depending on an operational mode for the electrophoresis). The temperature adjustment block 168 is divided into a plurality of small blocks or a plurality of regions and is configured to be able to perform control such that temperatures of the small blocks or the regions become different from each other. In addition, although not illustrated, the transport device 155 includes three electric motors and a linear actuator and can move a movement stage 165 provided in the transport device 155 in three axial directions, a vertical direction, a left-right direction, and a depth direction. In addition, at least one vessel or a sample plate (see FIGS. 7 to 10 and the like) to be described later can be mounted on the movement stage 165. Furthermore, the movement stage 165 has an electric grip 167 that can grip and release each vessel. An unnecessary vessel is stored in a predetermined storage place within the apparatus 101.

Example of Configuration of Pump Mechanism 113

Figure 2:
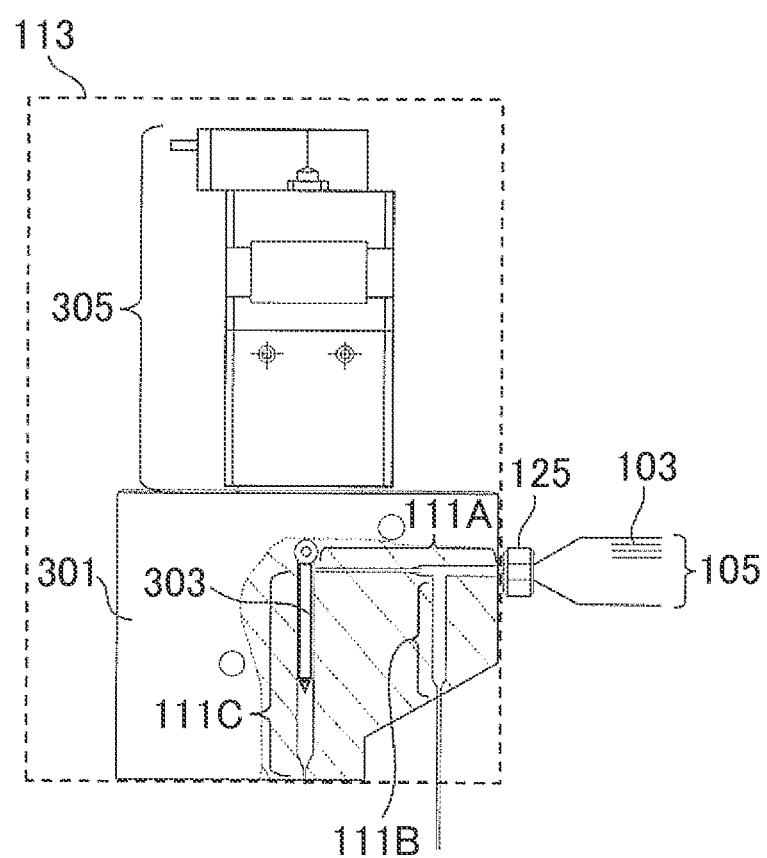
FIG. 2 is a diagram illustrating an example of a configuration of a pump mechanism 113 used in an electrophoresis apparatus 101 according to the present embodiment.

FIG. 2 is a diagram illustrating an example of a configuration of the pump mechanism 113 used in the electrophoresis apparatus 101 according to the present embodiment.

The pump mechanism 113 is mainly constituted by the block 301 in which the pump flow path 111 is formed, a plunger 303 that operates in the pump flow path 111, and a drive unit 305 that drives the plunger 303. The block 301 is a connection unit that causes the capillary array 105, the anode-side buffer vessel 139 (see FIG. 1), and the polymer vessel 109 (see FIG. 1) to communicate with each other. The pump flow path 111 connecting the capillary array 105, the anode-side buffer vessel 139, and the polymer vessel 109 is formed in the block 301. In the pump flow path 111, a flow path from a capillary connection unit connected to the capillary head 125 to the plunger 303 is a pump flow path 111A, a flow path that connects the pump flow path 111A and the anode-side buffer vessel 139 is a pump flow path 111B, and a flow path that connects the pump flow path 111A and the polymer vessel 109 is a pump flow path 111C. When the plunger 303 is driven in the pump flow path 111, the polymer 107 passes through the block 301, and the capillaries 103 are filled with the polymer 107 from the capillary anode terminal 137. The refilling of the polymer 107 in the capillaries 103 is performed for each measurement to improve the performance of the measurement.

The plunger 303 moves in the pump flow path 111C. The drive unit 305 lowers the plunger 303 to discharge the polymer 107 within the pump flow path 111C and sends the polymer 107 to the capillaries 103 via the pump flow path 111A. In addition, the drive unit 305 raises the plunger 303 to be able to aspirate the polymer 107 within the polymer vessel 109.

Circuit Configuration of Voltage Control Mechanism

Figure 3:
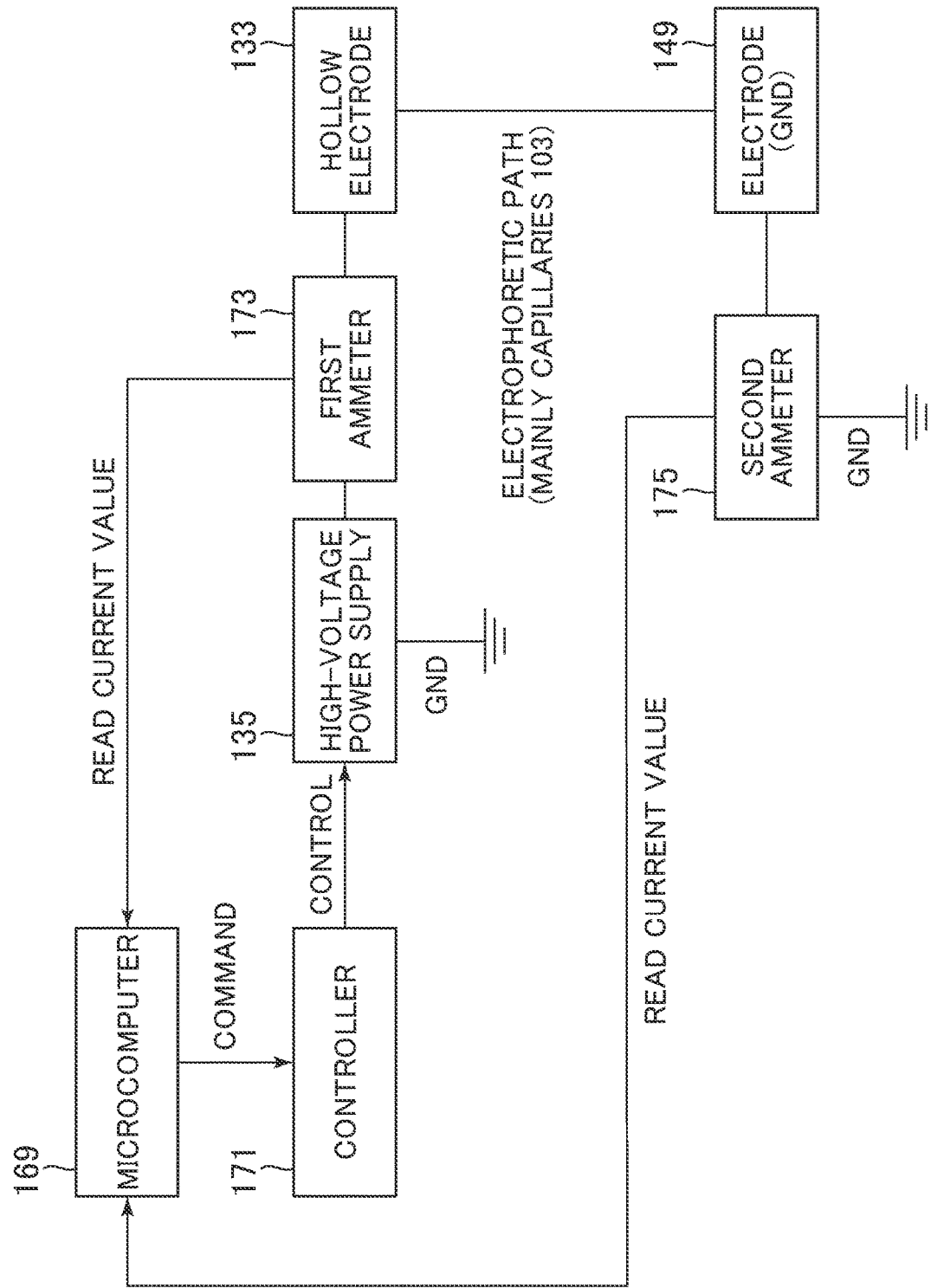
FIG. 3 is a high-voltage power supply circuit diagram illustrating a voltage control mechanism of the electrophoresis apparatus 101.

FIG. 3 is a high-voltage power supply circuit diagram illustrating a voltage control mechanism of the electrophoresis apparatus 101. The voltage control mechanism includes a microcomputer 169, a controller 171, a high-voltage power supply 135, a first ammeter 173, and a second ammeter 175.

The high-voltage power supply 135 applies a voltage to an energization path based on control of the controller 171. The energization path includes the hollow electrodes 133, a buffer 148 with which the cathode-side buffer vessel 157 is filled, an electrophoretic path, the buffer 147 with which the anode-side buffer vessel 139 is filled, and the electrode (GND) 149. The electrophoretic path includes the capillaries 103, the pump flow path 111, and the polymer 107 with which the connecting tube 143 is filled. The high-voltage power supply 135 is conductive with the hollow electrodes 133 via the first ammeter 173 and conductive with the electrode (GND) 149 via the second ammeter 175. Although omitted in FIG. 1, the second ammeter 207 is connected to the microcomputer 169. When a voltage of several tens of kilovolts is applied, an electric field is generated in a direction from the hollow electrodes 133 to the electrode (GND) 149. Due to the electric field, the sample such as a negatively charged nucleic acid moves from the capillary cathode terminal 131 to the capillary anode terminal 137.

The first ammeter 173 detects a current flowing from the high-voltage power supply 135 to the hollow electrodes 133 and transmits the value of the current to the microcomputer 169. The second ammeter 175 detects a current flowing from the electrode (GND) 149 to the GND and transmits the value of the current to the microcomputer 169. The second ammeter 175 is normally used to check a current value to be described later and a variation in the current value. This is due to the fact that the value of a current flowing in the electrophoretic path is directly reflected. A medium, such as the buffer 147 (148) or the polymer 107, having relatively larger resistance than metal is present between the first ammeter 173 and the second ammeter 175. Many connection units such as the block 301 and the capillary array 105 are present between the first ammeter 173 and the second ammeter 175. Therefore, in the circuit illustrated in FIG. 2, it can be said that a portion between the first ammeter 173 and the second ammeter 175 is a portion in which a measured current value easily has noise. On the other hand, the value indicated by the second ammeter 175 hardly include noise. The second ammeter 175 detects a net amount of a current flowing in the electrophoretic path.

The microcomputer 169 reads the current values from the first ammeter 173 and the second ammeter 175 and performs calculation. Then, the microcomputer 169 instructs the controller 171 to control the high-voltage power supply 135 to each of states for high-voltage application, low-voltage application, forced voltage cutoff, and the like. In addition, the microcomputer 169 can mutually communicate with the computer 117 arranged outside the apparatus body 101.

Electrophoresis Analysis Process

Figure 4:
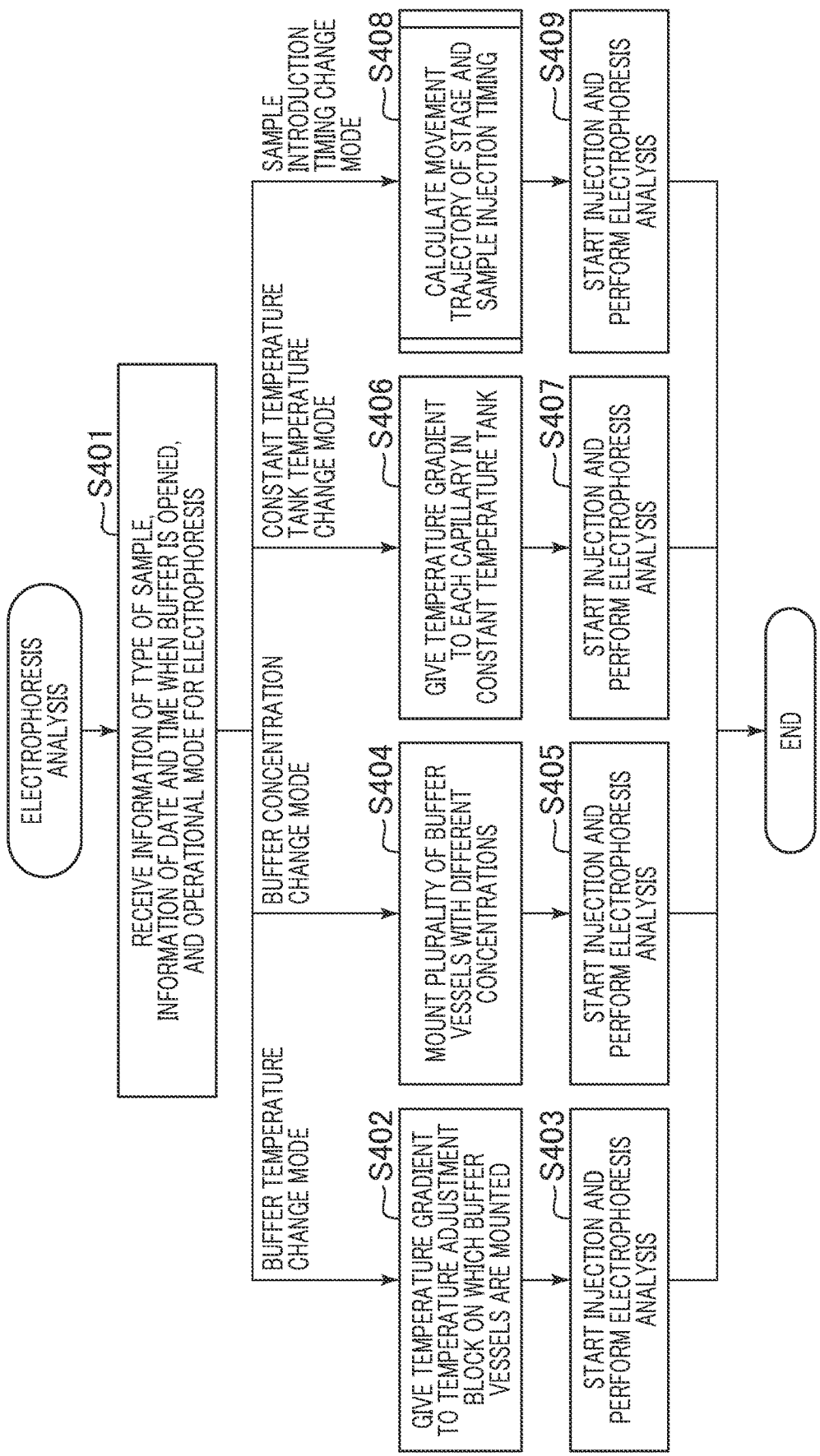
FIG. 4 is a flowchart for describing an overview of an electrophoresis analysis process to be performed in the electrophoresis system 10 according to the present embodiment.

FIG. 4 is a flowchart for describing an overview of an electrophoresis analysis process to be performed in the electrophoresis system 10 according to the present embodiment.

(i) Step 401

An operator operates the computer 117 to enter information of the type of the sample to be subjected to electrophoresis analysis and a date and time (date and time of the start of use) when the buffer is opened, and selects one of an operational mode for changing moving speeds of the sample and the buffer moving in the capillaries 103 of the capillary array 105, and an operational mode for shifting timings of injecting the sample in the capillaries. The processor (hereinafter referred to as a processor) of the computer 117 receives the operational mode selected by the operator and controls the electrophoresis apparatus 101 such that the electrophoresis apparatus 101 performs an operation corresponding to the operational mode. In this case, it is assumed that the number of capillaries is k and the capillaries are capillaries 1 to k. In addition, as the operational modes, the following operational modes are prepared. A mode 1: a buffer temperature change mode in which a temperature gradient is given to the temperature adjustment block 168 to perform temperature adjustment, and injection and electrophoresis analysis are performed to change the temperature of the buffer 148 stored in the cathode-side buffer vessel 157, a mode 2: a buffer concentration change mode in which injection and electrophoresis are performed from a plurality of buffer vessels (although one cathode-side buffer vessel 157 is illustrated in FIG. 1, when the mode 2 is selected, the individual buffer vessels 157_1 to k for the capillaries are mounted on the stage 165) in which concentrations of the buffer to be injected into the capillaries 103 are different, a mode 3: a constant temperature tank temperature change mode in which temperatures of the capillaries exposed from the buffer are adjusted to different temperatures or temperatures of the capillaries 103 are adjusted to different temperatures in the constant temperature tank 153 and temperatures of the buffer in the capillaries are changed at the time of the electrophoresis, and a mode 4: a sample introduction timing shift mode in which timings of injecting (introducing) the sample into the capillaries 103 are changed by moving the stage along a desired trajectory.

Another mode other than the modes 1 to 4 may be provided. A normal electrophoresis mode (mode in which the sample is injected in each capillary 103 at the same timing and the components contained in the sample move at the same speed) in which electrophoresis is not performed in accordance with the operational mode may be selected. Alternatively, a plurality of modes may be combined and performed. In addition, in the mode 1 or the mode 3, information (a target temperature of each of the buffer vessels 157_1 to k and a target temperature of each of the capillaries passing through the constant temperature tank 153) of temperature gradients of temperature adjustment units in the temperature adjustment block 168 and the constant temperature tank 153 is determined in advance based on the type of the sample and stored in a memory (ROM). The computer 117 may automatically select an appropriate mode from information at the start time of the electrophoresis analysis by storing and learning information obtained using each mode. Examples of the information are the type of the matrix standard, buffer concentration information, a buffer expiry date, opening date information, information of the temperature of the inside of the apparatus, information of the temperature of the temperature adjustment block 168, and the like, but the information is not limited thereto. The information indicates any information contributing to an arrival time for the sample that moves in the plurality of capillaries to reach the detection positions.

(ii) Step 402: Buffer Temperature Change Mode

When the mode 1 (buffer temperature change mode) is selected, the processor acquires, based on information of the type of the sample to be subjected to the electrophoresis analysis, information of the temperature of each of the small blocks or regions of the temperature adjustment block 168, and controls, based on the acquired information of the temperatures, a heating operation of the temperature adjustment block 168 such that the temperature of each of the small blocks or the temperature of each of the regions reaches a target temperature. When the temperature of each of the small blocks or each of the regions reaches the target temperature and stable (for example, the processor monitors the temperature of each of the small blocks or the temperature of each of the regions and determines whether the temperature of each of the small blocks or the temperature of each of the regions is stable based on a temperature profile), the process proceeds to step 403. Although the temperature adjustment block 168 on the cathode side illustrated in FIG. 1 is described as an example of this mode, the temperature adjustment is not limited thereto. Capillaries on the anode side may be individually temporarily provided and may individually perform temperature adjustment.

(iii) Step 403

The processor injects the sample from each of the buffer vessels 157_1 to k into each of the capillaries and moves the components contained in the sample injected in each of the capillaries to the detection unit 121 by the electrophoresis. In the mode 1 (buffer temperature change mode), since the temperatures of the buffer are different, moving speeds of the components within the capillaries are different. That is, the moving speed of a component injected from the buffer vessel (for example, the buffer vessel 157_1 in which the capillary 1 is immersed) with the highest temperature is the highest and the moving speed of a component injected from the buffer vessel (for example, the buffer vessel 157_k in which the capillary k is immersed) with the lowest temperature is the lowest. Therefore, timings of causing the components to reach the detection unit 121 can be shifted from each other among the capillaries, and thus it is possible to cancel the spatial crosstalk between fluorescence light detected by the plurality of capillaries 103.

Then, the detection unit 121 detects fluorescence light generated by irradiating the components contained in the sample moved in each of the capillaries with excitation light by the light source 127, and sample analysis is performed by the computer 117 on the fluorescence light as information light.

(iv) Step 404: Buffer Concentration Change Mode

When the mode 2 (buffer concentration change mode) is selected, the operator stores the plurality of types of the buffer with different concentrations in each of the buffer vessels 157_1 to k and mounts the buffer vessels 157_1 to k storing the buffer. When the mounting of each of the buffer vessels 157_1 to k is completed, the input device of the computer 117 is used to enter an instruction to start the electrophoresis. When receiving the instruction to start the electrophoresis, the processor controls the temperature adjustment block 168 such that the temperature of the temperature adjustment block 168 becomes a predetermined temperature (the temperatures of the plurality of small blocks or the plurality of regions become uniform). When the temperatures become the predetermined temperature, the process proceeds to step 405.

(v) Step 405

The processor simultaneously injects the sample from each of the buffer vessels 157_1 to k into each of the capillaries and moves the components contained in the sample injected in each of the capillaries to the detection unit 121 by the electrophoresis. In the mode 2 (buffer concentration change mode), since the concentrations of the buffer are different, the moving speeds of the components within the capillaries are different. That is, the moving speed of a component injected from the buffer vessel (for example, the buffer vessel 157_1 in which the capillary 1 is immersed) with the highest concentration is the highest and the moving speed of a component injected from the buffer vessel (for example, the buffer vessel 157_k in which the capillary k is immersed) with the lowest concentration is the lowest. Therefore, timings of causing the components to reach the detection unit 121 can be shifted from each other among the capillaries, and thus it is possible to cancel the spatial crosstalk between fluorescence light detected by the plurality of capillaries 103. As an example in this mode, it is preferable to adjust the concentrations of the buffers of both anode and cathode. However, the embodiment is not limited to this example. Capillaries on the anode side may be individually temporally provided and only the concentration on the anode side may be changed or only the concentration on the cathode side may be changed. In the example, the concentrations are changed. However, the embodiment is not limited to the concentrations. It suffices for conditions to change the electrophoretic mobility. For example, an electrical conductivity level and a pH level in the composition of the buffer may be changed. The mobility is faster when the electrical conductivity level is high or the pH level is on the acidic side.

Then, the detection unit 121 detects fluorescence light generated by irradiating the components contained in the sample in each of the capillaries with excitation light by the light source 127, and the sample analysis is performed by the computer 117 on the fluorescence light as information light.
(vi) Step 406: Constant Temperature Tank Temperature Change Mode When the mode 3 (constant temperature tank temperature change mode) is selected, the processor acquires temperature information of units (not illustrated: for example, temperature adjustment devices are independently attached to each of the capillaries and can adjust temperatures of the buffer in the capillaries to different temperatures) that individually adjust the temperatures of the capillaries in the constant temperature tank 153, and controls a heating operation of each of the temperature adjustment units such that the temperature of each of the capillaries reaches a target temperature. In this manner, the temperatures of the capillaries of the capillary array 105 that passes through the constant temperature tank 153 can be different and a temperature gradient can be given to each of the capillaries.

When the temperature adjustment units that adjust the temperatures of the capillaries 103 adjust each of the temperatures to a target temperature and each of the temperatures becomes stable (for example, the processor monitors the temperature of each of the capillaries 103 and determines whether the temperature of each of the capillaries 103 is stable based on the temperature profile), the process proceeds to step 407.
(vii) Step 407

The processor simultaneously injects the sample from each of the buffer vessels 157_1 to k into each of the capillaries, and moves the components contained in the sample injected in each of the capillaries to the detection unit 121 by the electrophoresis. In the mode 3 (constant temperature tank temperature change mode), since the temperatures of the capillaries 103 that pass through the constant temperature tank 153 are different, the moving speeds of the components within the capillaries are different. That is, the moving speed of a component that passes through the capillary (for example, the capillary 1) with the highest temperature is the highest and the moving speed of a component that passes through the capillary (for example, the capillary k) with the lowest temperature is the lowest. Therefore, timings of causing the components to reach the detection unit 121 can be shifted from each other among the capillaries, and thus it is possible to cancel the spatial crosstalk between fluorescence light detected by the plurality of capillaries 103.

Then, the detection unit 121 detects fluorescence light generated by irradiating the components contained in each of the capillaries with excitation light by the light source 127, and the sample analysis is performed by the computer 117 on the fluorescence light as information light.
(viii) Step 408: Sample Introduction Timing Shift Mode When the mode 4 (sample introduction timing shift mode) is selected, the processor calculates the movement trajectory of the movement stage for shifting of timings of injecting the sample and the timings of injecting the sample. Details of the step are described with reference to FIG. 5.
(ix) Step 409

The processor repeats a process of simultaneously injecting the sample into each of the capillaries from each well or the like of the sample plate while moving the stage in accordance with the operation trajectory of the movement stage 165 calculated in step 408 a plurality of times and moves the components contained in the sample injected in each of the capillaries to the detection unit 121. In the mode 4 (sample introduction timing shift mode), the moving speeds of the components contained in the sample introduced in each of the capillaries are the same, but timings of introducing the sample into the capillaries 103 are different and thus timings of causing the components contained in the sample introduced in each of the capillaries to reach the detection unit 121 are different. That is, for example, the component contained in the sample introduced in the capillary 1 reaches the detection unit 121 the earliest, and the component contained in the sample introduced in the capillary k reaches the detection unit 121 the latest. Therefore, it is possible to shift the timings of detecting fluorescence light from the capillaries from each other and thus it is possible to cancel the spatial crosstalk among the fluorescence light detected by the plurality of capillaries 103.

Then, the detection unit 121 detects fluorescence light generated by irradiating the components contained in the sample moved in each of the capillaries with excitation light by the light source 127, and the sample analysis is performed by the computer 117 on the fluorescence light as information light.

Stage Operation Calculation Process

Figure 5:
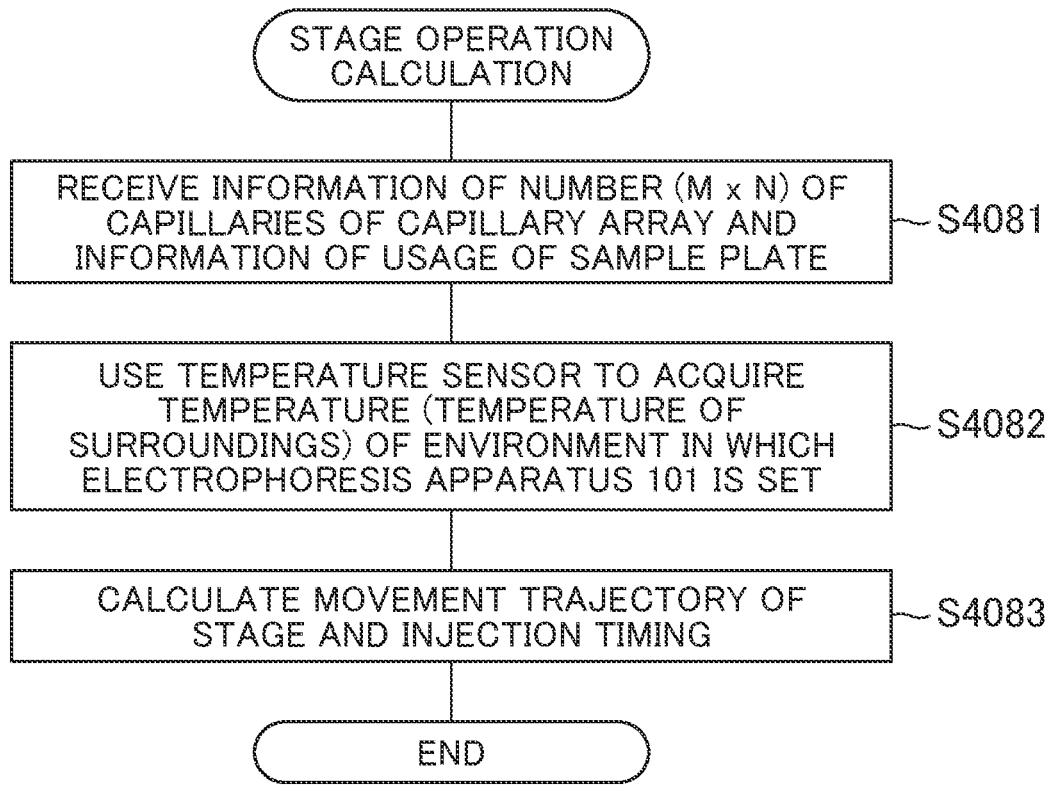
FIG. 5 is a flowchart for describing a detailed operation of step 408 of the electrophoresis analysis process illustrated in FIG. 4.

FIG. 5 is a flowchart for describing a detailed operation of step 408 in the electrophoresis analysis process illustrated in FIG. 4. It is assumed that the plurality of capillaries 103 in the vicinity of the load header 123 and the capillary cathode terminal 131 of the capillary array 105 are arrayed in a matrix form of M rows and N columns (M×N) (M and N are integers of 1 or greater). That is, it is assumed that the number of capillaries 103 is M×N.
(i) Step 4081

The processor displays, on a screen of the display device, the number (M×N) of capillaries of the capillary array 105 and an UI (example) that prompts to enter information of usage of the sample plate. Then, the processor receives the number (M×N) of capillaries and an entry of the information of the usage of the sample plate.

For example, when the capillaries in the vicinity of the capillary cathode terminal 131 of the capillary array 105 are arrayed in M rows and 1 column (the number M of capillaries), the sample plate may be moved in one direction (the X axis direction or the Y axis direction). In addition, when the capillaries in the vicinity of the capillary cathode terminal 131 of the capillary array 105 are arrayed in M rows and N columns (the number M×N of capillaries), the sample plate is moved two-dimensionally (in the X axis direction and the Y axis direction). To insert each of the capillaries in each well of the sample plate, it is necessary to move the sample plate also in the Z axis direction (vertical direction in FIG. 1). However, a description of the movement in the Z axis direction is omitted in the present disclosure.

In addition, for example, the information of the usage of the sample plate is information (for example, positional information in a case where samples are arranged at a plurality of wells, and positional information in a case where a sample is arranged at only one well) indicating an arrangement position of the sample on the sample plate.
(ii) Step 4082

The processor acquires information of an environment temperature acquired by a temperature sensor (not illustrated) installed in the electrophoresis apparatus 101. This is due to the fact that the timings of injecting the sample into the capillaries may be different depending on the environment temperature. Step 4082 is not an essential process. In addition, as another factor for determining the injection timing (timing at which a measured value peak appears), there is information of a degree (elapsed time from opening) of degradation acquired from the type of the sample and a date and time when the sample is opened.

(iii) Step 4083

The processor calculates a trajectory of the sample plate on the movement stage 165 based on the number (M×N) of capillaries of the capillary array 105 and the information of the usage of the sample plate. Although an example of the movement trajectory is described, how to inject the sample into all the capillaries 103 of the capillary array 105 at sequentially shifted timings is determined based on how to store the sample and the buffer on the sample plate having a number P×Q (P and Q are integers of 1 or greater) of wells and the arrayed state (whether the capillary array is an capillary array of capillaries arrayed in 1 column or a capillary array of capillaries arrayed in a plurality of columns) of the capillaries 103 in the vicinity of the load header 123 and the capillary cathode terminal 131 of the capillary array 105.

In addition, the processor determines when to inject the sample into each of the capillaries 1 to k while sequentially moving the movement stage based on information of the type of the sample, the degree of degradation of the buffer, and the environment temperature (acquired in step 4082). That is, information of the time when the sample is injected into each of the capillaries 1 to k is acquired. For example, when information of the sample injection time associated with the information of the type of the sample, the degree of degradation of the buffer, and the environment temperature is held in the ROM of the computer 117, the processor can use the information of the sample and the like as indexes to acquire the information of the above-described sample injection time.

Method of Giving Temperature Gradient in Buffer Temperature Change Mode

FIG. 6 are diagrams for describing a method of giving a temperature gradient to the buffer stored in the plurality of buffer vessels.

Figure 6A:
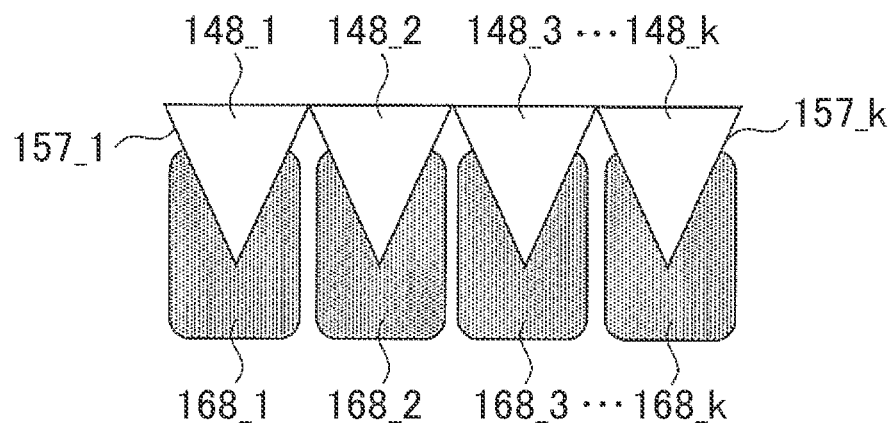
FIG. 6A is a diagram illustrating an example of a configuration for adjusting temperatures of small blocks into which a temperature adjustment block 168 is divided to different temperatures.

FIG. 6A is a diagram illustrating an example of a configuration for adjusting temperatures of a plurality of small blocks into which the temperature adjustment block 168 is divided to different temperatures. As illustrated in FIG. 6A, the temperature adjustment block 168 is configured such that the buffer vessels 157_1 to 157_k are mounted on the small blocks 168_1 to 168_k of the temperature adjustment block and that the temperature adjustment block 168 is configured to be able to individually adjust temperatures of buffers 148_1 to 149_k stored in the buffer vessels 157_1 to 157_k. In the present embodiment, for example, each of the capillaries 1 to k constituting the capillary array 105 is immersed in the buffer 148_1 stored in the buffer 157_1 to the buffer 148_k stored in the buffer vessel 157_k. The small blocks 168_1 to 168_k of the temperature adjustment block 168 perform temperature adjustment such that the temperature decreases sequentially from high to low (for example, 60° C. to 20° C.) in order of the small blocks 168_1 to 168_k, whereby a temperature gradient can occur in the buffers 148_1 to 148_k stored in the buffer vessels. As described above, since the capillaries are immersed in the buffers with different temperatures, the moving speeds of the components contained in the sample in the capillaries can be different and it is possible to cancel the spatial crosstalk among fluorescence light detected by the plurality of capillaries.

Figure 6B:
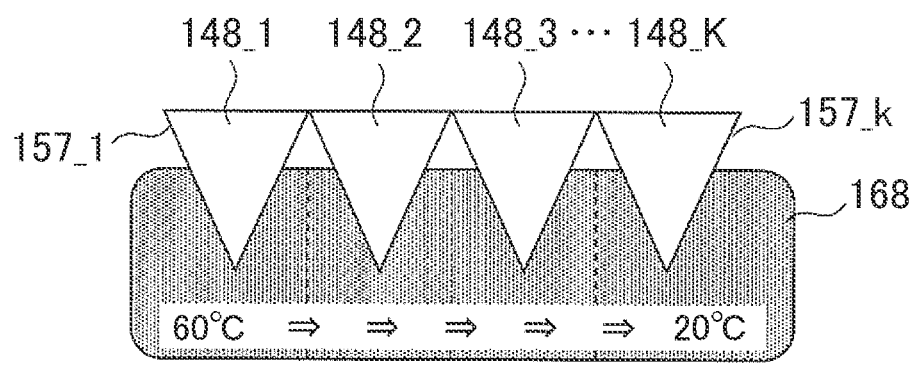
FIG. 6B is a diagram illustrating an example of a configuration for adjusting temperatures of regions into which the temperature adjustment block 168 is divided to different temperatures.

FIG. 6B is a diagram illustrating an example of a configuration for adjusting temperatures of a plurality of regions into which the temperature adjustment block 168 is divided to different temperatures. As illustrated in FIG. 6B, the buffer vessels 157_1 to 157_k are mounted on the plurality of regions of the temperature adjustment block, and the buffers 148_1 to 148_k are stored in the buffer vessels 157_1 to 157_k. The temperature adjustment block 168 performs temperature adjustment while giving a temperature gradient to the buffers 148_1 to 148_k stored in the buffer vessels 157_1 to 157_k such that the temperature gradually decreases in order from the region 1 to the region k (for example, 60° C. to 20° C.). In the present embodiment, for example, the capillaries 1 to k constituting the capillary array 105 are immersed in the buffer 148_1 stored in the buffer vessel 157_1 to the buffer 148_k stored in the buffer vessel 157_k. Since the capillaries are immersed in the buffers with different temperatures, the moving speeds of the components contained in the sample in the capillaries can be different and it is possible to cancel the spatial crosstalk among fluorescence light detected by the plurality of capillaries.

Figure 6C:
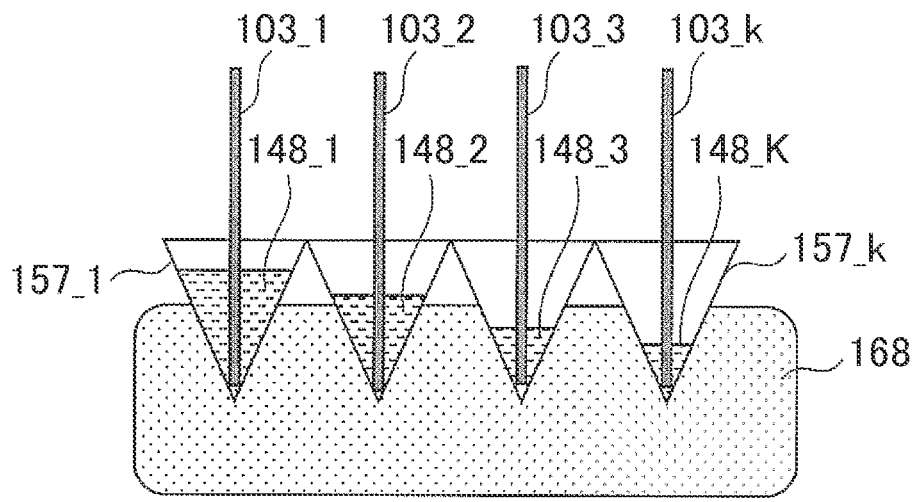
FIG. 6C is a diagram illustrating an example of a configuration for changing lengths of portions of a plurality of capillaries 1 to k immersed in buffers to give a temperature gradient to the capillaries.

FIG. 6C is a diagram illustrating an example of a configuration for giving a temperature gradient to the capillaries by changing lengths of portions of the plurality of capillaries 1 to k to be immersed in the buffers. As illustrated in FIG. 6C, the buffer vessels 157_1 to 157_k storing different amounts of the buffers 148_1 to 148_k are mounted on the temperature adjustment block 168 heated to a uniform temperature (desired temperature). Since the amounts of the buffers stored in the buffer vessels are different, lengths of portions of the capillaries 103_1 to 103_k in contact with the buffers are different when the plurality of capillaries 103_1 to 103_k are immersed in the buffers 148_1 to 148_k. Therefore, even when the temperatures of the buffers 148_1 to 148_k are adjusted to the same temperature, effective temperatures of the insides of the capillaries 103_1 to 103_k are different. As a result, the timings at which the components contained in the sample injected in the capillaries 103_1 to 103_k reach the detection unit 121 are different. Therefore, it is possible to cancel the spatial crosstalk among fluorescence light detected by the plurality of capillaries.

Figure 6D:
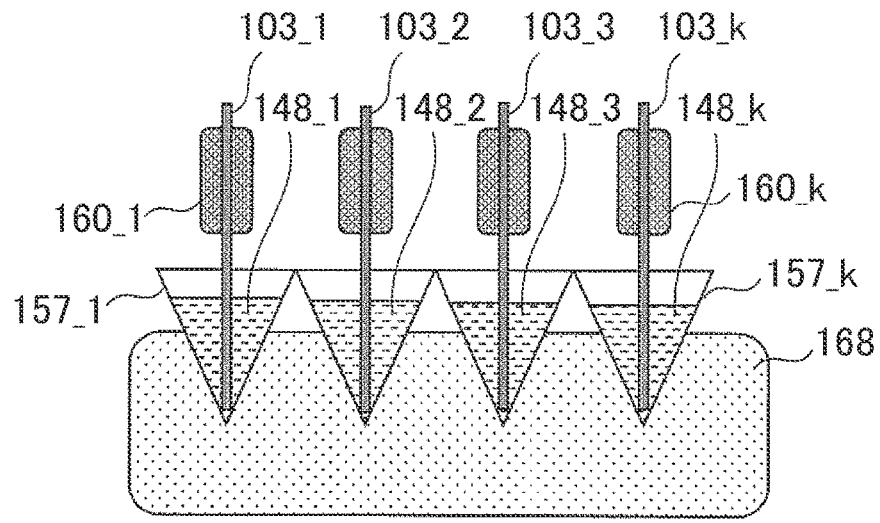
FIG. 6D is a diagram illustrating an example of a configuration for adjusting temperatures of exposed portions of capillaries 103 to different temperatures to give a temperature gradient to the insides of the capillaries.

FIG. 6D is a diagram illustrating an example of a configuration for adjusting temperatures of exposed portions of the capillaries 103 to different temperatures to give a temperature gradient to the capillaries. As illustrated in FIG. 6D, the buffer vessels 157_1 to 157_k storing the buffers 148_1 to 148_k in approximately the same amount are mounted on the temperature adjustment block 168 heated to the uniform temperature (desired temperature). Then, capillary temperature adjustment units 160_1 to 160_k are individually attached to the exposed portions (portions not immersed in the buffers and not included in the constant temperature tank 153) of the plurality of capillaries 103_1 to 103_k immersed in the buffers 148_1 to 148_k. The capillary temperature adjustment units 160_1 to 160_k perform temperature adjustment at different temperatures to give a temperature gradient to the capillaries 103_1 to 103_k. In this case, the moving speeds of the components contained in the sample injected in the capillaries 103_1 to 103_k at the same timing are different, and the components contained in the sample injected in the capillaries 103_1 to 103_k at the same timing reach the detection units 121 at different timings. Therefore, it is possible to cancel the spatial crosstalk among fluorescence light detected by the plurality of capillaries.

Movement Operation of Plate and Like in Sample Introduction Timing Shift Mode

FIGS. 7 to 11 are diagrams for describing a movement operation and a sample injection operation of the sample plate in the sample introduction timing shift mode (mode 4).

Figure 7A:
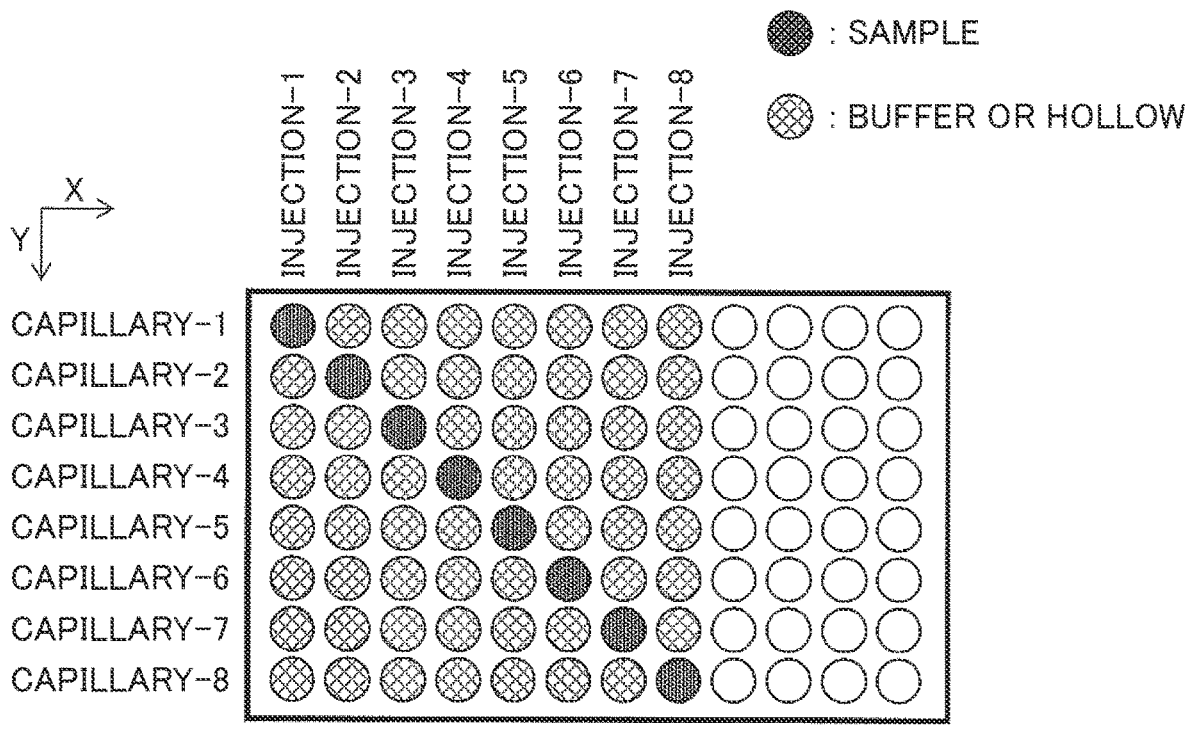
FIG. 7A is a diagram illustrating an example in which sample injection and electrophoresis are performed using a capillary array having eight capillaries of M=8 and N=1 arrayed in a single column and 64 wells of P=8 and Q=8 of a sample plate.
Figure 7B:
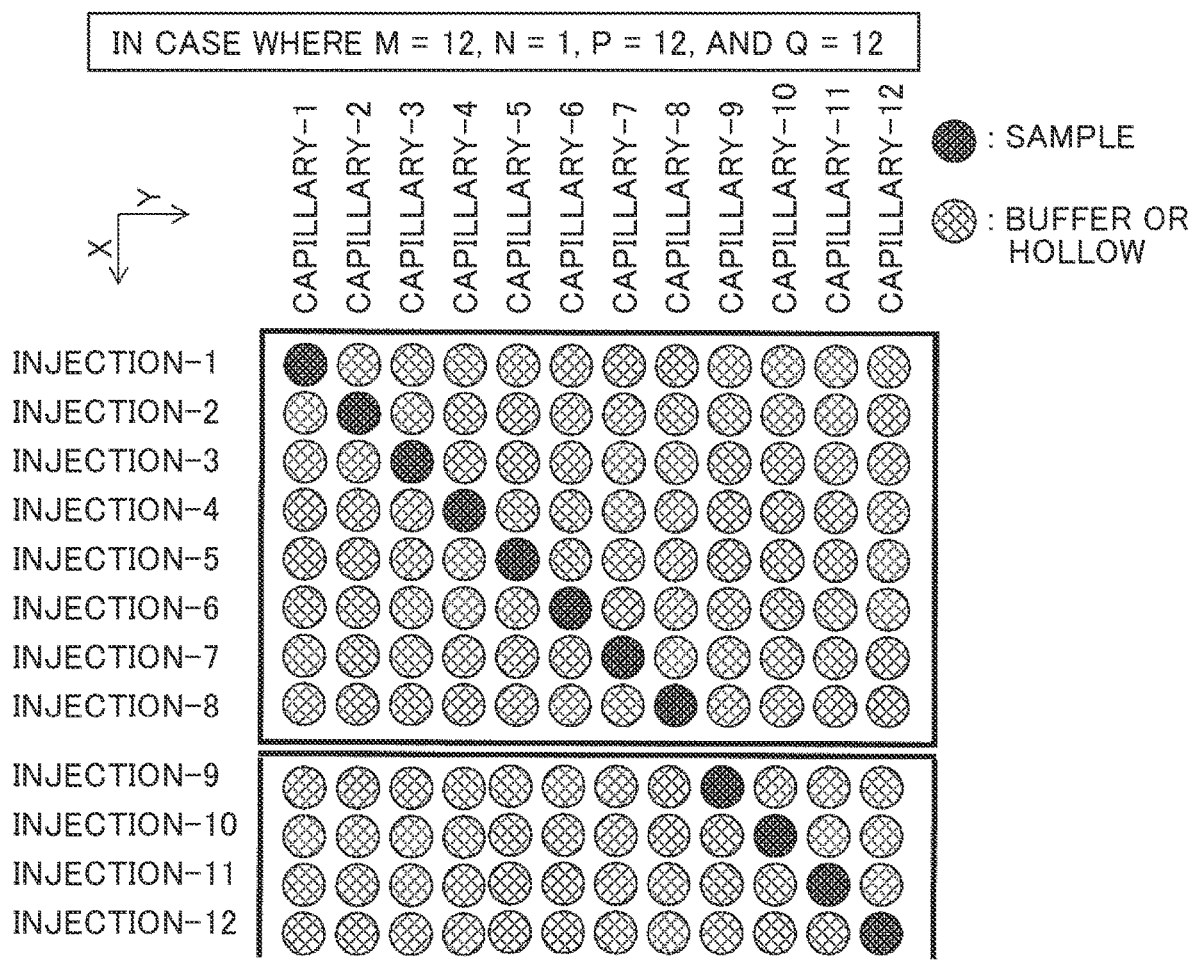
FIG. 7B is a diagram illustrating an example in which sample injection and electrophoresis are performed using a capillary array having 12 capillaries of M=12 and N=1 arrayed in a single column and 144 wells of P=12 and Q=12 of a sample plate.

(i) In Case Where Number P×Q of Wells of Sample Plate are Used to Perform Sample Injection (Injection) in Capillary Array Configuration with One Column FIG. 7A is a diagram illustrating an example in which sample injection and electrophoresis are performed using a capillary array having a one-column configuration with eight capillaries of M=8 and N=1 and 64 wells of P=8 and Q=8 of a sample plate. In this case, a direction in which the number M of capillaries are arrayed is the same as a direction in which the number P of wells are arrayed (vertical direction of FIG. 7A, the Y axis direction), and a direction in which the N capillary is arrayed is the same as a direction in which the number Q of wells are arrayed (horizontal direction of FIG. 7A, the X axis direction). In addition, array intervals (pitches) thereof are equal. On the other hand, FIG. 7B is a diagram illustrating an example in which sample injection and electrophoresis are performed using a capillary array having a one-column configuration with 12 capillaries of M=12 and N=1 and 144 wells of P=12 and Q=12 of a sample plate. When a standard plate with 96 wells arrayed in eight rows and 12 columns at pitches of 9 mm is used, the number of sample plates in the case illustrated in FIG. 7A is 1, but two sample plates are required for the case illustrated in FIG. 7B. Generally speaking, to inject the sample in each of the capillaries arrayed in the number M of rows and one column in the capillary array at timings shifted for each capillary, a space for a number M×M of wells is required. For example, when N=1 and M=8, 64 wells, that is, 0.7 sample plates are required. When N=1 and M=12, 144 wells, that is, 1.5 sample plates are required. When N=1 and M=24, 576 wells, that is, six sample plates are required. When N=1 and M=48, 2304 wells, that is, 24 sample plates are required. When N=1 and M=96, 9216 wells, that is, 96 sample plates are quired. Therefore, when (i) is to be performed in the mode 4, realistically, N is approximately 12. This is due to the fact that a preparation task for filling each well of the sample plates with the sample and the buffer before performing electrophoresis is required and the number of sample plates that can be mounted is limited.

When a case where M=8 and N=1 is described, the operator fills the sample plate with the sample and the buffer (places for the buffer may be hollow) as illustrated in FIG. 7A. In a state in which the sample is arranged as illustrated in FIG. 7A and the capillary array arrayed in the Y axis direction is fixed, the operation of the movement stage 165 is controlled such that the sample plate is sequentially moved in parallel to the X axial direction and the sample injection is sequentially performed. First, a number M=8 of capillaries are immersed in a number P=8 of wells at positions indicated by Injection-1, and the sample is injected into only the capillary 1. Then, all the number M=8 of capillaries are immersed in the buffer and the electrophoresis is performed for a certain time period. Second, a number M=8 of capillaries are immersed in a number P=8 of wells at positions indicated by Injection-2, and the sample is injected into only the capillary 2. Then, all the number M=8 of capillaries are immersed in the buffer and the electrophoresis is performed for the certain time period. Thereafter, the same operation is repeated. Lastly, a number M=8 of capillaries are immersed in a number P=8 of wells at positions indicated by Injection-8, and the sample is injected into only the capillary 8. Then, all the number M=8 of capillaries are immersed in the buffer and the electrophoresis is performed for the certain time period. Therefore, it is possible to shift the timings of injecting the sample into the capillaries 103 from each other.

When M=12 and N=1, the operator fills the sample plate with the sample and the buffer (places for the buffer may be hollow) as illustrated in FIG. 7B. In a state in which the sample is arranged as illustrated in FIG. 7B and the capillary array arrayed in the Y axis direction is fixed, the operation of the movement stage 165 is controlled such that the sample plate is sequentially moved in parallel to the X axial direction and the sample injection is sequentially performed. First, a number M=12 of capillaries are immersed in a number P=12 of wells at positions indicated by Injection-1, and the sample is injected into only the capillary 1. Then, all the number M=12 of capillaries are immersed in the buffer and the electrophoresis is performed for a certain time period. Second, a number M=12 of capillaries are immersed in a number P=12 of wells at positions indicated by Injection-2, and the sample is injected into only the capillary 2. Then, all the number M=12 of capillaries are immersed in the buffer and the electrophoresis is performed for the certain time period. Thereafter, the same operation is repeated. Lastly, a number M=12 of capillaries are immersed in a number P=12 of wells at positions indicated by Injection-12, and the sample is injected into only the capillary 8. Then, all the number M=12 of capillaries are immersed in the buffer and the electrophoresis is performed for the certain time period. Therefore, it is possible to shift timings of injecting the sample into the capillaries 103 from each other.

Although the sample injection is performed by electric field injection, the sample injection may be performed by pressure injection. During the time when the sample is injected into one capillary, the electrophoresis is performed in the other capillaries. However, when the wells are not the buffer and are hollow, a voltage is not applied and the electrophoresis is not performed. In addition, when the wells are hollow, discharging and drying may occur, which may adversely affect the electrophoretic analysis. Therefore, it is preferable that the wells store the buffer instead of being hollow. On the other hand, when the wells are hollow, the user can omit a task of preparing the sample plate.

Figure 8:
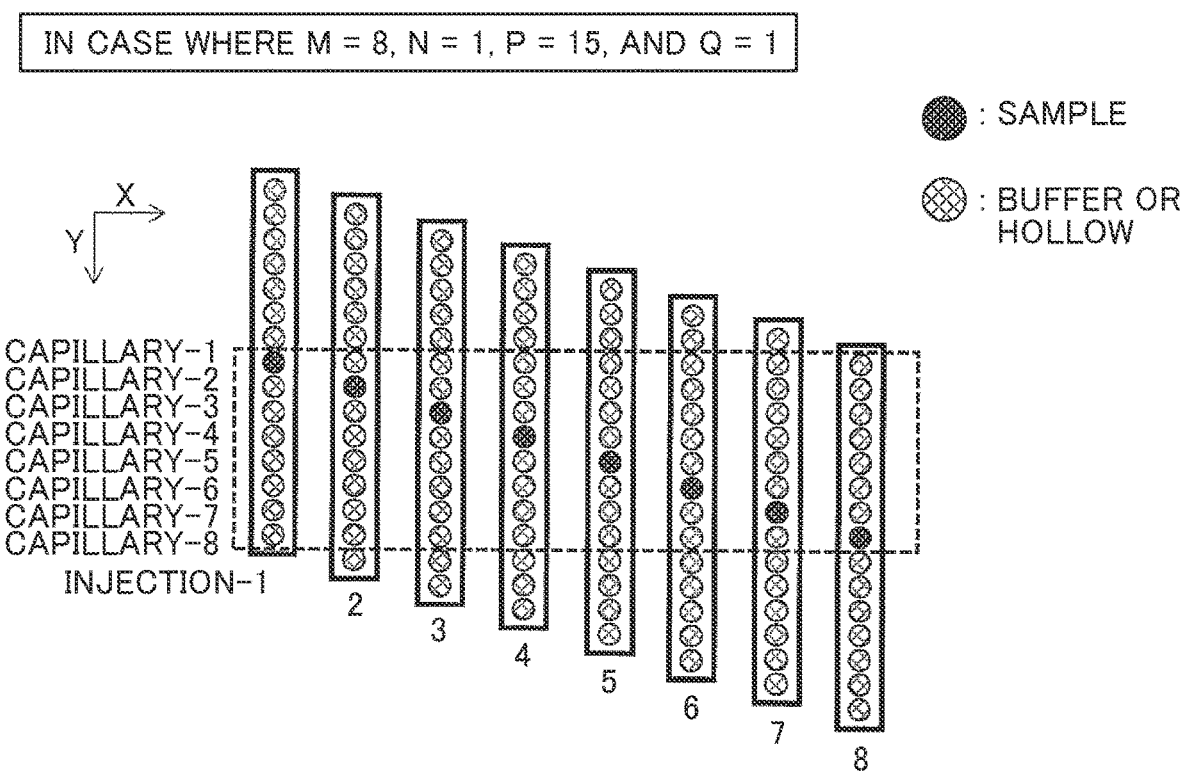
FIG. 8 is a diagram illustrating an example in which sample injection and electrophoresis are performed using a capillary array having eight capillaries of M=8 and N=1 arrayed in a single column at pitches of 9 mm and 15 wells of P=15 and Q=1 of a sample plate.

(ii) In Case Where Number (2×M−1) of Wells of Sample Plate are Used to Perform Sample Injection (Injection) on Capillary Array with Number M of Capillaries Arrayed in One Column in Y Axis Direction FIG. 8 is a diagram illustrating an example in which sample injection and electrophoresis are performed using a capillary array with eight capillaries of M=8 and N=1 arrayed in one column and 15 wells of P=15 and Q=1 of a sample plate. In this case, the 15 wells are arrayed in the Y axis direction at pitches of 9 mm. While the shape and position of the capillary array 105 are fixed, it is possible to shift, from each other, the timings of injecting the sample by controlling the movement stage 157 such that the sample plate having the 15 wells is sequentially slid and moved by a distance (9 mm) for one well in the Y axis direction. Although FIG. 8 illustrates the sample plate having a one-dimensional configuration, a standard plate having a two-dimensional configuration with one column may be used to perform the sample injection in a similar manner.

In FIG. 7A, 64 wells are used for the eight capillaries of M=8 and N=1. On the other hand, in FIG. 8, while the 15 wells are used for the eight capillaries of M=8 and N=1, effects similar to those obtained in FIG. 7A are obtained.

FIG. 8 is described in detail. As illustrated in FIG. 8, the sample plate is filled with the sample and the buffer (places for the buffer may be hollow). In a state in which the sample is set as illustrated in FIG. 8 and the capillary array arrayed in the Y axis direction is fixed, the operation of the movement stage 165 is controlled such that the sample plate is sequentially moved in parallel to the Y axis direction and the sample injection is sequentially performed. First, eight capillaries are immersed in eight wells surrounded by a dotted line and located at positions indicated by Injection-1, and the sample is injected into only the capillary 1. Then, all the number M=8 of capillaries are immersed in the buffer and the electrophoresis is performed for a certain time period. Second, eight capillaries are immersed in eight wells surrounded by a dotted line and located at positions indicated by Injection-2, and the sample is injected into only the capillary 2. Then, all the number M=8 of capillaries are immersed in the buffer and the electrophoresis is performed for a certain time period. Thereafter, the same operation is repeated. Lastly, a number M=8 of capillaries are immersed in eight wells surrounded by a dotted line and located at positions indicated by Injection-8, and the sample is injected into only the capillary 8. Then, all the number M=8 of capillaries are immersed in the buffer and the electrophoresis is performed. Therefore, it is possible to shift the timings of injecting the sample into the capillaries 103 from each other.

As described above, when the capillary array 105 having the one-column configuration with the number M of capillaries is used, it is possible to achieve the above-described purpose by sliding and moving the sample plate (a number 2×M−1 of wells) with a number 2×M−1 of rows and 1 column in a direction in which the capillaries are arrayed. On the other hand, in FIGS. 7A and 7B, a similar purpose is achieved using a number M×M of wells for the capillary array 105 having the one-column configuration with the number M of capillaries. That is, it is possible to significantly reduce the number of necessary wells by this method. The larger the effect, the larger M.

The above-described method includes a process of inserting a plurality of capillaries in the same well on the sample plate at different timings. Particularly, the method includes a process of immersing, at different timings, the plurality of capillaries in the sample with which the same well on the sample plate is filled. In addition, the method includes a process of immersing, at different timings, all the capillaries constituting the capillary array into the sample with which the same well on the sample plate is filled.

Figure 9:
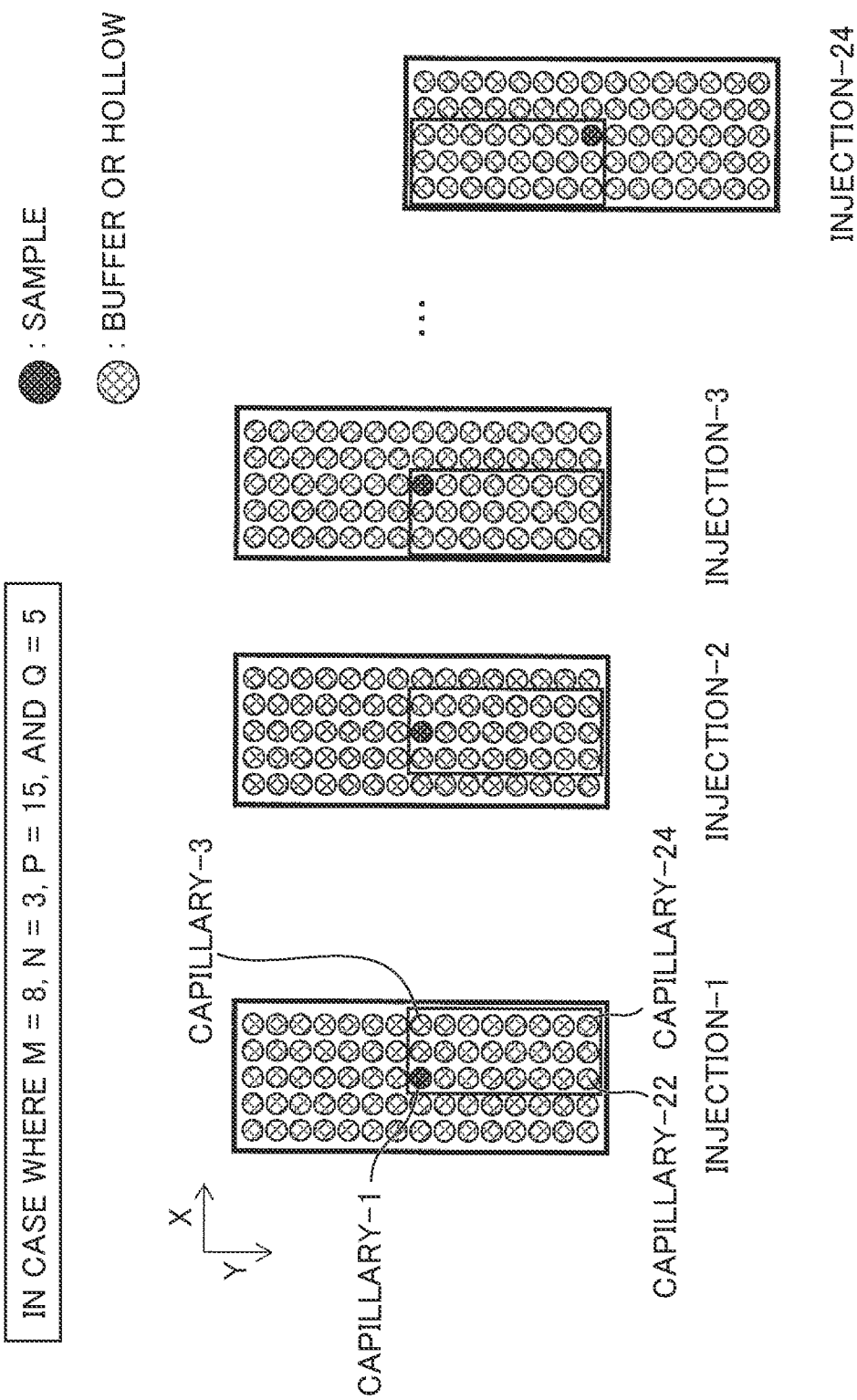
FIG. 9 is a diagram illustrating an example in which sample injection and electrophoresis are performed using a capillary array having 24 capillaries of M=8 and N=3 arrayed at pitches of 9 mm and a sample plate having 75 wells of P=15 and Q=5 arrayed at pitches of 9 mm.

(iii) In Case Where Sample Injection (Injection) is Performed Using Number (2×M−1)×(2×N−1) of Wells of Sample Plate for Capillary Array Having Configuration of Number M of Rows and Number N of Columns FIG. 9 is a diagram illustrating an example in which the sample injection and the electrophoresis are performed using a capillary array with 24 capillaries of M=8 and N=3 arrayed at pitches of 9 mm and a sample plate with 75 wells of P=15 and Q=5 arrayed at pitches of 9 mm. In this case, it is assumed that a direction in which the number M=8 of capillaries are arrayed and a direction in which the number P=15 of wells are arrayed are the Y axis direction. In addition, it is assumed that a direction in which the number N=3 of capillaries are arrayed and a direction in which the number Q=5 of wells are arrayed are the X axis direction.

As illustrated in FIG. 9, the 24 capillaries are arrayed in a solid-line frame such that the capillary 1 is located at the top left, the capillary 3 is located at the top right, the capillary 22 is located at the bottom left, and the capillary 24 is located at the bottom right. In addition, only one well located at the center among the 75 at pitches of 9 mm wells is filled with the sample, and the other wells are filled with the sample or are hollow. While the shape and position of the capillary array 105 are fixed, the movement stage 165 is controlled such that the sample plate having the 75 wells is slid and moved in the X axis direction and the Y axis direction. That is, the movement stage 165 is moved such that the capillary 1, the capillary 2, the capillary 3, . . . , and the capillary 24 are sequentially arranged on the well filled with the sample. Therefore, it is possible to shift the timings of injecting the sample into each of the capillaries 103 from each other.

FIG. 9 is described in detail. As illustrated in FIG. 9, the sample plate is filled with the sample and the buffer (places for the buffer may be hollow). In a state in which the capillary array is fixed, the operation of the movement stage 165 is controlled such that the sample plate is sequentially moved in parallel to the X axis direction and the Y axis direction, and the sample injection is sequentially performed. First, the sample plate is moved such that the sample plate is in a state indicated by Injection-1, the 24 capillaries are immersed in 24 wells surrounded by a solid line, and the sample is injected into only the capillary 1. Then, all the capillaries 24 are immersed into the buffer and the electrophoresis is performed for a certain time period. Second, the sample plate is moved such that the sample plate is in a state indicated by Injection-2, the 24 capillaries are immersed into 24 wells surrounded by a solid line, and the sample is injected into only the capillary 2. Then, all the 24 capillaries are immersed into the buffer, and the electrophoresis is performed for the certain time period. Thereafter, the same operation is repeated. Lastly, the sample plate is moved such that the sample plate is in a state indicated by Injection-24, the 24 capillaries are immersed into 24 wells surrounded by a solid line, and the sample is injected into only the capillary 24. Then, all the 24 capillaries are immersed into the buffer and the electrophoresis is performed. Therefore, it is possible to shift the timings of injecting the sample into the capillaries from each other.

Figure 10:
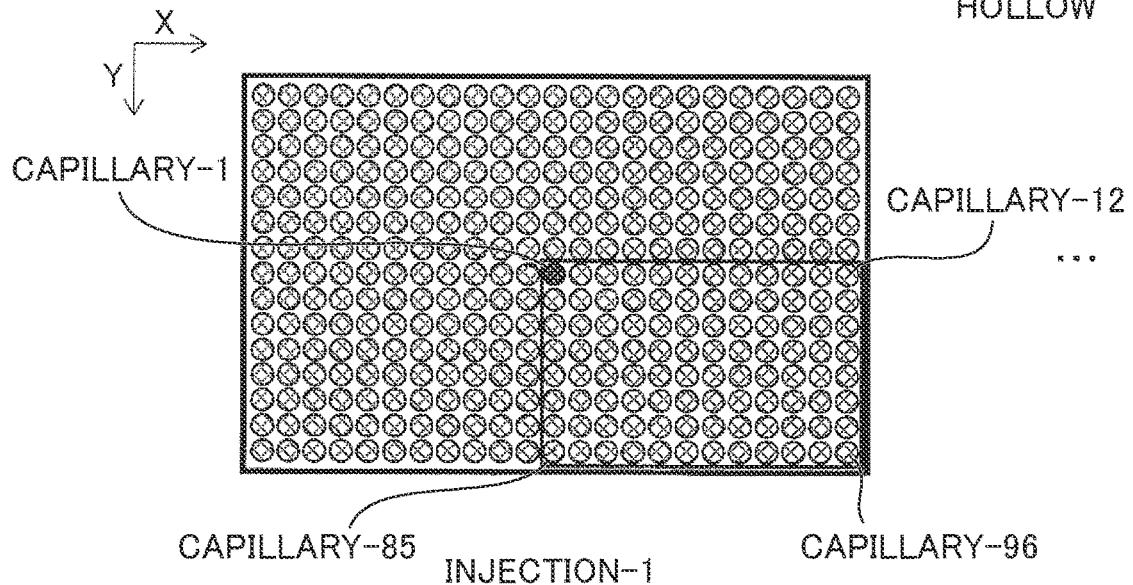
FIG. 10 is a diagram illustrating an example in which sample injection and electrophoresis are performed using a capillary array having 96 capillaries of M=12 and N=8 arrayed at pitches of 9 mm and a sample plate having 345 wells of P=23 and Q=15 arrayed at pitches of 9 mm.

FIG. 10 is a diagram illustrating an example in which the sample injection and the electrophoresis are performed using a capillary array with 96 capillaries of M=12 and N=8 arrayed at pitches of 9 mm and a sample plate with 345 wells of P=23 and Q=15 arrayed at pitches of 9 mm. In this case, a direction in which the number M=12 of capillaries are arrayed and a direction in which the number P=23 of wells are arrayed are the X axis direction. In addition, a direction in which the number N=8 of capillaries are arrayed and a direction in which the number Q=15 of wells are arrayed are the Y axis direction.

As illustrated in FIG. 10, the 96 capillaries are arrayed in a solid-line frame such that the capillary 1 is located at the top left, the capillary 12 is located at the top right, the capillary 85 is located at the bottom left, and the capillary 96 is located at the bottom right. In addition, only one well located at the center among the 345 wells is filled with the sample, and the other wells are filled with the buffer. While the shape and position of the capillary array 105 are fixed, the movement stage 165 is controlled such that the sample plate having the 345 wells is slid and moved in the X axis direction and the Y axis direction. That is, similarly to FIG. 9, the movement stage 165 is moved such that the capillary 1, the capillary 2, the capillary 3, . . . , and the capillary 96 are sequentially arranged on the well filled with the sample. Therefore, it is possible to shift the timings of injecting the sample into the capillaries from each other.

As described above, when a capillary array 105 having a number M×N of capillaries is used, it is possible to achieve the above-described purpose by sliding and moving a sample plate having a number (2×M−1)×(2×N−1) of wells in the X axis direction and the Y axis direction.

Although the above-described examples of FIGS. 7A to 10 describe the cases where the pitches at which the plurality of capillaries are arrayed and the pitches at which the plurality of wells are arrayed are 9 mm, other array pitches can be used. For example, the pitches at which the plurality of capillaries are arrayed and the pitches at which the plurality of wells are arrayed may be 4.5 mm. In addition, the pitches at which the plurality of capillaries are arrayed can be different from the pitches at which the plurality of wells are arrayed. Particularly, it is advantageous to set the "pitches at which the plurality of capillaries are arrayed" to be larger than the "pitches at which the plurality of wells are arrayed" since the size of the sample plate can be small and the movement range of the sample plate can be small. For example, while the pitches at which the plurality of capillaries are arrayed are 9 mm, the pitches at which the plurality of wells are arrayed may be 2.25 mm. In this case, a process of inserting the plurality of capillaries on the same well on the sample plate at different timings is not necessarily required.

(iv) In Case Where Number of Wells is Reduced

Figure 11A:
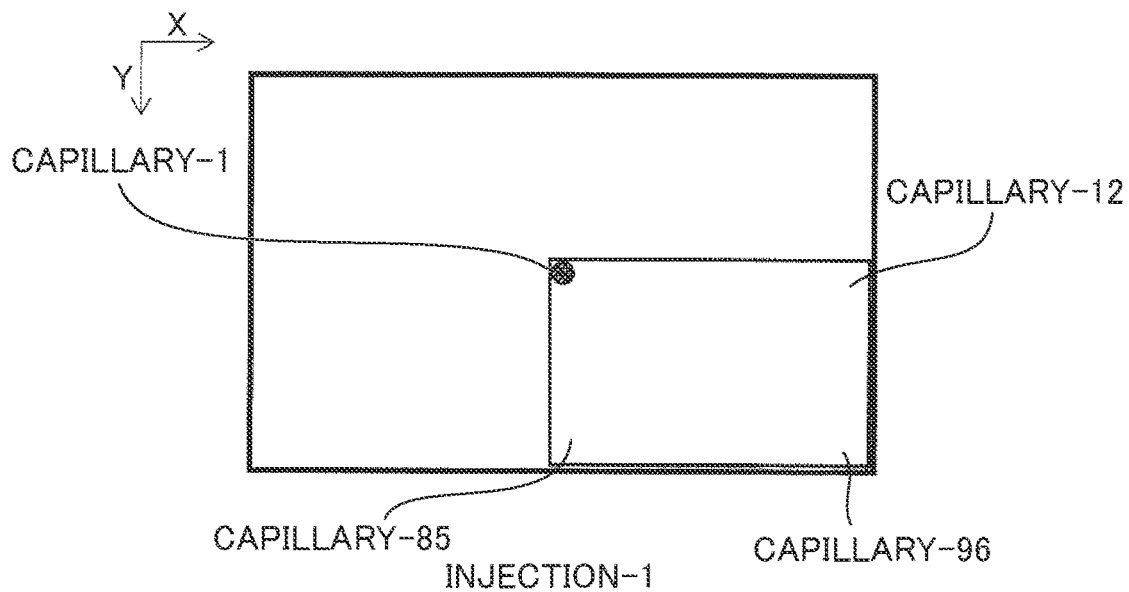
FIG. 11A is a diagram illustrating an example in which the number of wells used when a sample plate is used is reduced.
Figure 11B:
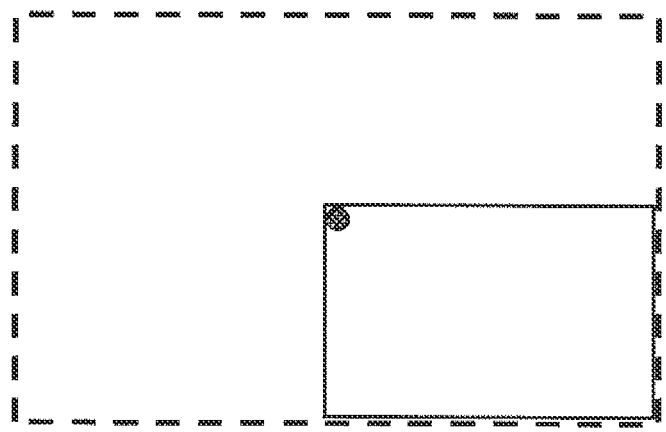
FIG. 11B is a diagram illustrating an example in which a sample plate is not used.

FIG. 11 are diagrams illustrating an example of a configuration in which the number of wells is reduced. FIG. 11A is a diagram illustrating an example in which the number of wells used when the sample plate is used is reduced. FIG. 11B is a diagram illustrating an example in which the sample plate is not used.

In FIG. 10, the wells other than the central well filled with the sample among the 345 wells may be filled with the buffer or may be hollow. When the wells are hollow, the wells themselves may be removed. FIG. 11A illustrates the example in which the wells other than the central well filled with the sample are removed. However, the size of the sample plate is equivalent with that in the case of FIG. 10. In addition, the control of the movement stage 165 is similar to that in the case of FIG. 10. Therefore, since the wells to be used on the sample plate can be removed, it is possible to omit an operation of filling each well with the buffer and to reduce the manufacturing cost of the sample plate. Even in such a simple configuration, it is possible to shift the timings of injecting the sample into the capillaries from each other.

FIG. 11B illustrates an example in which the sample plate itself is removed from FIG. 11A. It is possible to shift the timings of injecting the sample into the capillaries from each other by using only one well filled with the sample and moving the movement stage 165 in a similar manner to the case of FIG. 10. However, in this case, it is necessary to secure a space (region indicated by a dotted line) of the same size as the sample plate on the movement stage 165. By performing this, the configuration is made simpler and the manufacturing cost can be further reduced.

Relationship Between Timing of Injecting Sample and Timing of Measuring Peak of Fluorescence Light The examples describe the case where the fluorescence signals derived from the sample of each of the capillaries are detected after the electrophoresis analysis is performed and the timings of injecting the sample into the capillaries are shifted from each other during the electrophoresis analysis performed once. However, a situation may occur in which the time when the fluorescence signal of the capillary into which the sample is injected first is obtained may be earlier than the time when the fluorescence signal of the capillary into which the sample is injected last is obtained. In such a case, the electrophoresis analysis may be divided into a plurality of analysis operations to avoid the occurrence of the above-described situation. For example, when a capillary array with 24 capillaries 1 to 24 is used, the above situation can be avoided by performing the sample injection while shifting the timings of injecting the sample into the capillaries 1 to 8 in the first electrophoresis analysis, performing the sample injection while shifting the timings of injecting the sample into the capillaries 9 to 16 in the second electrophoresis analysis, and performing the sample injection while shifting the timings of injecting the sample into the capillaries 17 to 24 in the third electrophoresis analysis. Next, a method of shifting the timings of injecting the sample into the capillaries from each other and shifting the timings of obtaining fluorescence signals of the capillaries from each other while accepting the above-described situation is described below.

Figure 13:
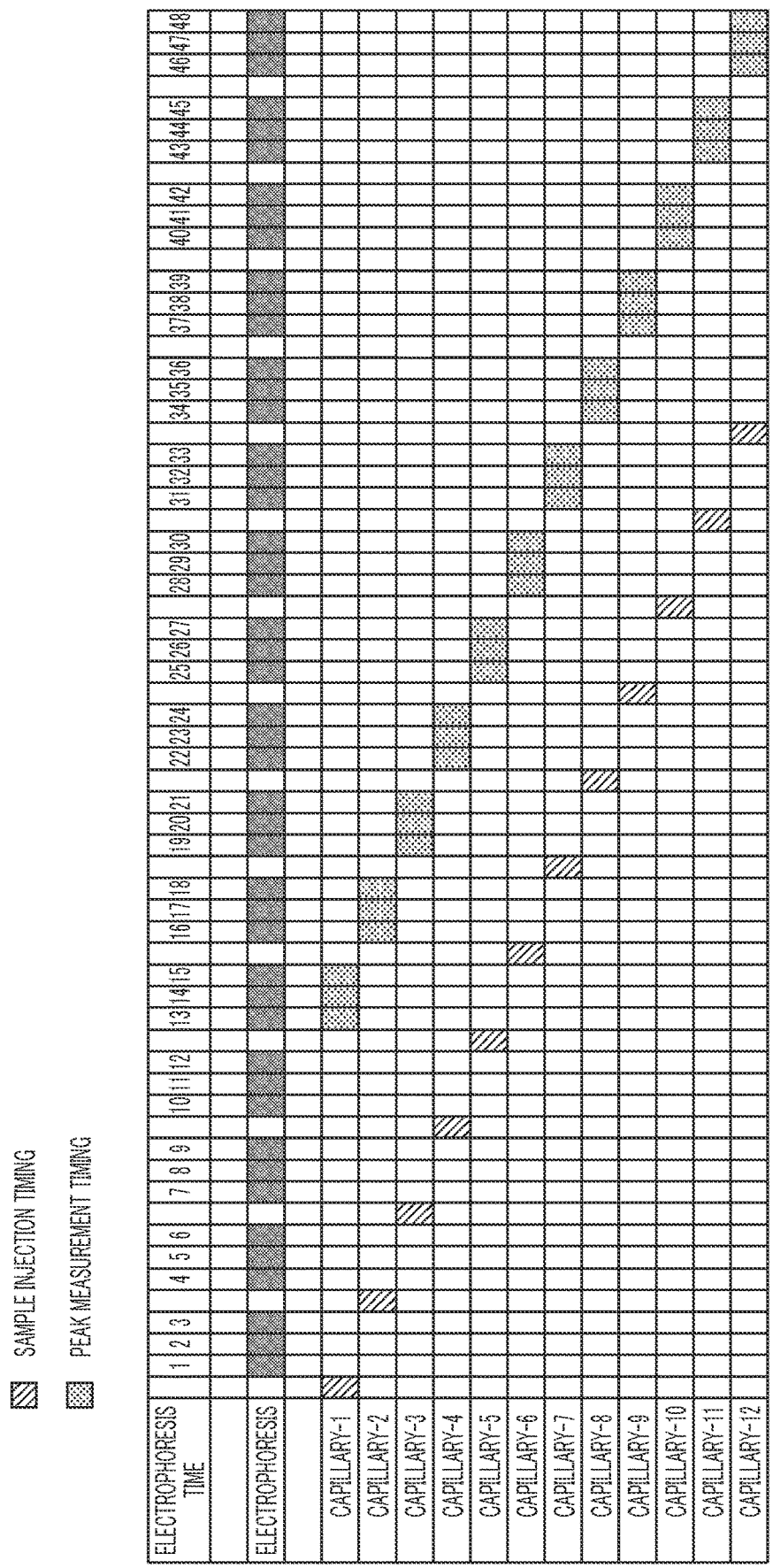
FIG. 13 is a diagram illustrating a relationship between sample injection time points (sample injection timings) in the sample introduction timing shift mode (mode 4) and peak measurement time points (peak measurement timings) (2).

FIGS. 12 and 13 are diagrams illustrating a relationship between sample injection time points (sample injection timings) in the sample introduction timing shift mode (mode 4) and peak measurement time points (peak measurement timings).

As illustrated in FIGS. 12 and 13, in the example of the present embodiment, the electrophoresis analysis is performed for only three minutes after the injection of the sample into the capillary 1 at time of zero minutes, and the electrophoresis analysis is performed for only three minutes after the injection of the sample into the capillary 2 at time of three minutes. Thereafter, the same operation is repeated. The electrophoresis analysis is performed for only three minutes after the injection of the sample into the capillary S at time of (S−1) 3 minutes. However, a peak of a fluorescence signal derived from a component contained in the sample injected in each of the capillaries is measured for a time period from 12 minutes to 15 minutes after the start of the electrophoresis. That is, the peak of the fluorescence signal of the capillary 1 is measured at the time of the electrophoresis between the time of 12 minutes when the sample is injected into the capillary 5 and the time of 15 minutes when the sample is injected into the capillary 6. In this case, a plurality of components may be contained in the sample, and a plurality of peaks derived from fluorescence signals of phosphors with which each of the components is labeled may be obtained in each of the capillaries. Subsequently, a peak of a fluorescence signal of the capillary 2 is measured at the time of the electrophoresis between the time of 15 minutes when the sample is injected into the capillary 6 and the time of 18 minutes when the sample is injected into the capillary 7. Thereafter, the same operation is repeated. A peak of a fluorescence signal of the capillary (S−4) is measured at the time of the electrophoresis between the time of (S−1) 3 minutes when the sample is injected into the capillary S and the time of S*3 minutes when the sample is injected into the capillary (S+1). Although not illustrated in FIGS. 12 and 13, the electrophoresis analysis may be continuously performed until fluorescence signals of all the capillaries are obtained after the completion of the injection of the sample into all the capillaries. By performing this, the time of the injection of the sample into each of the capillaries does not overlap the time of the detection of each of the peaks, and it is possible to measure fluorescence signals from each of the capillaries at different timings in an excellent manner. As described above, this method has a feature in which the sample injection and the measurement of the peak of a fluorescence signal are alternately performed.

In addition, timings at which peaks appear when fluorescence light is detected from the sample are different (vary) depending on the type of the sample, the environment temperature, and the degree of degradation of the buffer (elapsed time after the buffer vessels are opened or the number of times that the buffer is used). Therefore, the processor of the computer 117 needs to determine the operation (movement trajectory) of the movement stage 165 based on the number of wells used on the sample plate and the configuration (configuration with N rows and M columns) of the capillary array 105, and calculate and control the time of the sample injection to be performed each time based on the type of the sample, the environment temperature, the degree of degradation of the buffer, and the like, as described above. For example, the processor of the computer 117 may measure, in advance, timings at which peaks appear based on a plurality of environment temperatures and a plurality of degrees of degradation of the buffer for each of various samples, convert the measured timings into a table (the table format may not be used when data items are associated with each other), and cause the table to be held in the ROM of the computer 117 or the like. Then, when the electrophoresis is actually performed, the processor can acquire peak measurement timings (estimated values) corresponding to the types of samples, the environment temperatures, the degrees of degradation of the buffer, and the like, and determine timings of injecting the sample into each of the capillaries.

Others: Modifications, Additional Examples, and Like (i) The compositions of the samples may be different for each of the capillaries. That is, a DNA fragment length labeled with each phosphor is set to be different for each of the samples to be injected into each of the capillaries. For example, the DNA fragment lengths set to be different may be different by one base between the capillaries.

Figure 14:
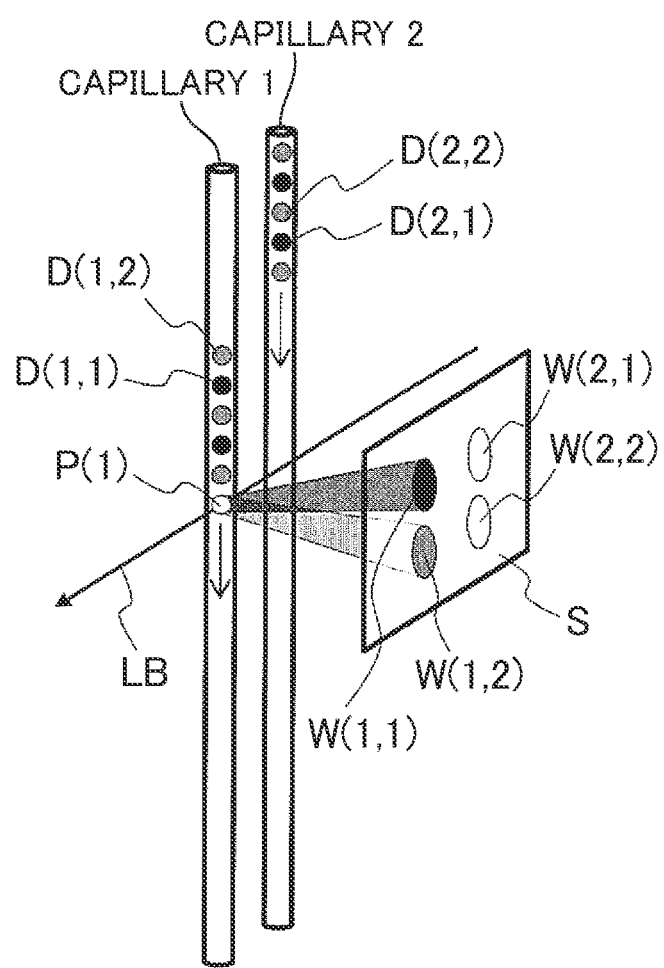
FIG. 14 is a diagram for describing an operation of shifting timings of detecting fluorescence light of the capillaries from each other in a case where base lengths of samples are different.

FIG. 14 is a diagram for describing an operation of shifting timings of detecting fluorescence light of the capillaries from each other in a case where base lengths of the samples are different. In this case, although the sample injection of the capillary 1 and the sample injection of the capillary 2 are performed at the same timing, the samples are prepared such that a phosphor D(1, 1) and a phosphor D(1, 2) in the capillary 1 and a phosphor D(2, 1) and a phosphor D(2, 2) in the capillary 2 emit fluorescence light at different points of time. That is, the composition (DNA fragment length) of the sample injected in the capillary 1 is made different from the composition (DNA fragment length) of the sample injected in the capillary 2, and the electrophoresis velocities of substances labeled with each of phosphors are made different. For example, the samples may be prepared such that a DNA fragment having a base length of 50 and labeled with the phosphor D(1, 1) and a DNA fragment having a base length of 60 and labeled with the phosphor D(1, 2) are contained in the sample injected in the capillary 1, and that a DNA fragment having a base length of 70 and labeled with the phosphor D(2, 1) and a DNA fragment having a base length of 80 and labeled with the phosphor D(2, 2) are contained in the sample injected in the capillary 2. In FIGS. 14, W(1, 1) to W(2, 2) indicate detection regions in different wavelength bands.

Alternatively, FIG. 14 can be obtained by setting electrophoresis conditions different for the capillary 1 and the capillary 2 even when samples with the same composition are injected in the capillary 1 and the capillary 2 at the same timing. For example, during the electrophoresis, a voltage to be applied to the capillary 2 is temporality reduced, the temperature of the capillary 2 at the time of the electrophoresis is reduced, or the like.

The buffer vessels in this case can store samples with different base lengths and can be constituted by a plurality of individual buffer vessels into which each of the capillaries is inserted one by one.

(ii) In the above-described embodiment, the movement stage 165 is moved to enable the injection of the sample into each of the capillaries. However, the embodiment is not limited thereto. A drive device may be attached to the capillary array 105 (for example, an arm drive device or a stage that can move in the X, Y, and Z directions may be attached to the capillary array), and the capillary array (capillary head) 105 side may be moved.

(iii) Although the above-described embodiment describes the example in which the XY stage is used as the movement stage 165, an EWOD device may be used to transport the sample or a linear motor transport system may be used to transport a tube (vessel) storing the sample.

(iv) Although the above-described embodiment describes the example (FIGS. 6A to 6D) in which a temperature gradient is given to the buffer 148 of the cathode-side buffer vessel 157, the embodiment is not limited to the cathode side and the anode side may be used. That is, in the technical effects according to the present embodiment, a temperature gradient may be given to the buffer stored in at least one of the cathode-side buffer vessel 157 and the anode-side buffer vessel 139.

(v) Although the above-described embodiment describes the example (mode 2: buffer concentration change mode) in which a concentration gradient is given to the buffer 148 of the cathode-side buffer vessel 157, the embodiment is not limited to the cathode side and the anode-side may be used. That is, in the technical effects according to the present embodiment, a concentration gradient may be given to the buffer stored in at least one of the cathode-side buffer vessel 157 and the anode-side buffer vessel 139.

LIST OF REFERENCE SIGNS

10 Electrophoresis system
101 Electrophoresis apparatus
103 Capillary
105 Capillary array
107 Polymer
109 Polymer vessel
111 Pump flow path
113 Pump mechanism
117 Computer
119 Communication cable
121 Detection unit
123 Load header
125 Capillary head
127 Light source
129 Optical detector
131 Capillary cathode terminal
133 Hollow electrode
135 High-voltage power supply
137 Capillary anode terminal
139 Anode-side buffer vessel
141 Check valve
143 Connecting tube
145 Electric valve
147, 148 Buffer
149 Electrode (GND)
151 Optical detector
153 Constant temperature tank
155 Transport device
157 Cathode-side buffer vessel 159 Cleaning vessel
161 Waste liquid vessel
163 Sample vessel
165 Movement stage
167 Grip
168 Temperature adjustment block
169 Microcomputer
171 Computer
173 First ammeter
175 Second ammeter
301 Block
303 Plunger
305 Drive unit

The invention claimed is:

1. An electrophoresis system comprising:
an electrophoresis apparatus including:
a plurality of capillaries in which electrophoresis of samples are respectively performed;
a light source that irradiates detection positions of the capillaries with light;
a detector that detects light generated by the irradiation with the light by the light source and depending on components contained in the samples;
a buffer storage unit into which one ends of the plurality of capillaries are inserted at a time of the electrophoresis of the sample and in which buffers are stored; and
a computer that controls the electrophoresis apparatus,
wherein the computer is configured to control an electrophoresis condition of each of the plurality of capillaries in the electrophoresis apparatus such that arrival times for the components that move in the plurality of capillaries to reach the detection positions are shifted from each other, and
wherein the electrophoresis apparatus is configured to cancel a spatial crosstalk by calculating a ratio of the spatial crosstalk between different capillaries that constitute the plurality of capillaries based on fluorescence signals from each of the capillaries that the detector acquired and subtracting a contribution of the spatial crosstalk based on the ratio.

2. The electrophoresis system according to claim 1,
wherein the arrival times for the components to reach the detection positions are shifted by changing moving speeds of the components in each of the plurality of capillaries.

3. The electrophoresis system according to claim 2,
wherein the buffers have different temperatures, different concentrations, different pH levels, or different electrical conductivity levels.

4. The electrophoresis system according to claim 1,
wherein the electrophoresis apparatus includes a temperature adjustment block that individually adjusts temperatures of the plurality of capillaries, and
the computer is configured to control a temperature adjustment operation of the temperature adjustment block to give a temperature gradient in a direction in which the plurality of capillaries are arrayed.

5. The electrophoresis system according to claim 1, further comprising:
a plurality of capillary temperature adjustment blocks respectively disposed in contact with the capillaries.

6. The electrophoresis system according to claim 1,
wherein the electrophoresis apparatus includes a stage on which the buffer storage unit is mounted, the stage having a plurality of motors and on which the buffer storage unit is disposed,
wherein the stage is configured to move to change a position of the buffer storage unit with respect to the plurality of capillaries.

7. The electrophoresis system according to claim 6,
wherein the computer is configured to determine the movement trajectory of the stage based on information of storage positions of the samples in the vessels and information of an array of the plurality of capillaries.

8. The electrophoresis system according to claim 7,
wherein the computer is configured to determine a timing of injecting the sample into a target capillary based on an electrophoresis condition including a type of the sample and a temperature of a peripheral environment in which the electrophoresis is performed after the stage is sequentially moved.

9. The electrophoresis system according to claim 7,
wherein the buffer storage unit includes at least one sample storage unit that stores the sample, and
wherein the computer is configured to move the stage to change a capillary to be inserted in the sample storage unit among the plurality of capillaries such that timings of injecting the sample into the plurality of capillaries are shifted from each other.

10. An electrophoresis system comprising:
an electrophoresis apparatus including:
a plurality of capillaries in which electrophoresis of samples are respectively performed;
a light source that irradiates detection positions of the capillaries with light;
a detector that detects light generated by the irradiation with the light by the light source and depending on components contained in the samples; and
a buffer storage unit into which one ends of the plurality of capillaries are inserted at a time of the electrophoresis of the sample and in which a buffer is stored; and
a computer that controls the electrophoresis apparatus,
wherein the buffer storage includes a plurality of individual buffer vessels into which the plurality of capillaries are inserted one by one,
wherein the plurality of individual buffer vessels include different samples containing components with different base lengths and the plurality of capillaries are configured to perform electrophoresis on the different samples, and
wherein the electrophoresis apparatus is configured to cancel a spatial crosstalk by calculating a ratio of the spatial crosstalk between different capillaries that constitute the plurality of capillaries based on fluorescence signals from each of the capillaries that the detector acquired and subtracting a contribution of the spatial crosstalk based on the ratio.

11. The electrophoresis system according to claim 10,
wherein the arrival times for the components to reach the detection positions are shifted by changing moving speeds of the components in each of the plurality of capillaries.

12. The electrophoresis system according to claim 11,
wherein the electrophoresis apparatus includes a plurality of capillary temperature adjustment blocks that individually adjusts temperatures of the plurality of capillaries, and
wherein the computer is configured to control a temperature adjustment operation of the capillary temperature adjustment blocks to give a temperature gradient in a direction in which the plurality of capillaries are arrayed.

13. The electrophoresis system according to claim 10,
wherein the buffer storage unit includes at least one sample storage unit that stores the sample, and
wherein the computer is configured to move the stage to change a capillary to be inserted in the sample storage unit among the plurality of capillaries such that timings of injecting the sample into the plurality of capillaries are shifted from each other.

14. An electrophoresis system comprising:
wherein an electrophoresis apparatus including
a plurality of capillaries in which electrophoresis of a sample is performed,
a light source that irradiates detection positions of the capillaries with light,
a detector that detects light generated by the irradiation with the light by the light source and depending on components contained in the sample, and
a buffer storage unit into which one ends of the plurality of capillaries are inserted at a time of the electrophoresis of the sample and in which a buffer is stored; and
a computer that controls the electrophoresis apparatus,
wherein the computer is configured to control the electrophoresis by the electrophoresis apparatus for each of a plurality of types of electrophoresis operational modes, and
wherein the plurality of types of electrophoresis operational modes include a first mode in which a temperature gradient occurs in the buffer, and a second mode in which timings of injecting the sample into the plurality of capillaries are changed, and
wherein the electrophoresis apparatus is configured to cancel a spatial crosstalk by calculating a ratio of the spatial crosstalk between different capillaries that constitute the plurality of capillaries based on fluorescence signals from each of the capillaries that the detector acquired and subtracting a contribution of the spatial crosstalk based on the ratio.

15. The electrophoresis system according to claim 14,
wherein the arrival times for the components to reach the detection positions are shifted by changing moving speeds of the components in each of the plurality of capillaries.

16. The electrophoresis system according to claim 15,
wherein the electrophoresis apparatus includes a plurality of capillary temperature adjustment blocks that individually adjusts temperatures of the plurality of capillaries, and
wherein the computer is configured to control a temperature adjustment operation of the capillary temperature adjustment blocks to give a temperature gradient in a direction in which the plurality of capillaries are arrayed.

* * * * *